United States Patent
Ohkawa

(10) Patent No.: US 7,621,657 B2
(45) Date of Patent: Nov. 24, 2009

(54) LIGHT EMITTING DEVICE, SURFACE LIGHT SOURCE DEVICE, DISPLAY AND LIGHT FLUX CONTROL MEMBER

(75) Inventor: Shingo Ohkawa, Misato (JP)

(73) Assignee: Enplas Corporation, Saitama (JP)

( * ) Notice: Subject to any disclaimer, the term of this patent is extended or adjusted under 35 U.S.C. 154(b) by 48 days.

(21) Appl. No.: 11/657,076

(22) Filed: Jan. 24, 2007

(65) Prior Publication Data
US 2008/0007966 A1 Jan. 10, 2008

(30) Foreign Application Priority Data

Jan. 24, 2006 (JP) .............................. 2006-014833
Feb. 15, 2006 (JP) .............................. 2006-038402

(51) Int. Cl.
*F21V 7/00* (2006.01)
*F21V 5/00* (2006.01)
*F21V 7/04* (2006.01)

(52) U.S. Cl. ........................ 362/311; 362/309; 362/336; 362/326; 362/612

(58) Field of Classification Search ................. 362/311, 362/331, 307–309, 335–338, 340, 222, 223, 362/326, 257, 612; 313/498, 501, 512
See application file for complete search history.

(56) References Cited

U.S. PATENT DOCUMENTS 4,609,978 A * 9/1986 Hsieh et al. .................. 362/335

7,254,309 B1 * 8/2007 Chou et al. .................. 385/146
7,348,723 B2 * 3/2008 Yamaguchi et al. ......... 313/501
7,445,370 B2 * 11/2008 Ohkawa ...................... 362/617
2005/0093430 A1 * 5/2005 Ibbetson et al. ............. 313/501
2008/0137331 A1 * 6/2008 Kaneko et al. .............. 362/231

FOREIGN PATENT DOCUMENTS

JP 07-191311 7/1995

* cited by examiner

*Primary Examiner*—Jacob Y Choi
(74) *Attorney, Agent, or Firm*—Staas & Halsey LLP

(57) ABSTRACT

Light from light emitting element enters into a flux control member through a recess on an inner face of the light flux control member, being emitted from an emission control face (outer face). At least so far as light falls within a half-intensity-angular-range, the light satisfies Condition 1 (($\theta5/\theta1$)>1 except for light in the vicinity of a normal direction of the emission control face) and Condition 2 (Value of $\theta5/\theta1$ gets smaller gradually with increasing of $\theta1$). It is noted that $\theta1$, $\theta5$ are angles made at being inner-incident to the emission control face and at being emitting from the same, respectively. The emission control face has a planar outline shape which is anisotropic around optical axis L, thereby causing value of $\theta5/\theta1$ to have a change depending on direction angle $\phi$ around optical axis L, with the result that highly uniform light is supplied to a required anisotropic irradiation range.

28 Claims, 22 Drawing Sheets

——————— : RAYS ON X1-X1 CROSS SEC.
----------- : RAYS ON X3-X3 CROSS SEC.

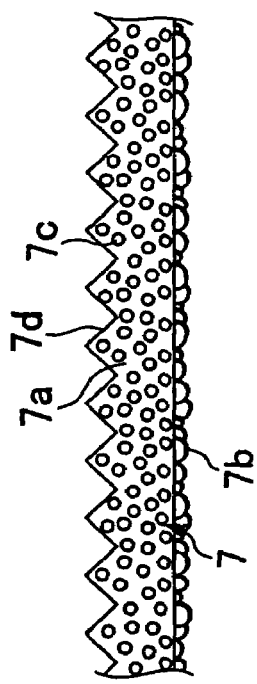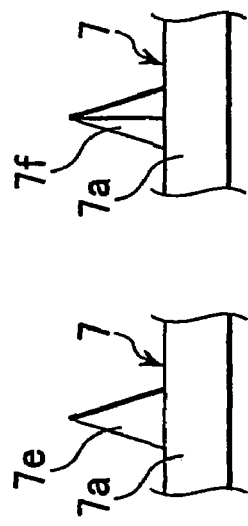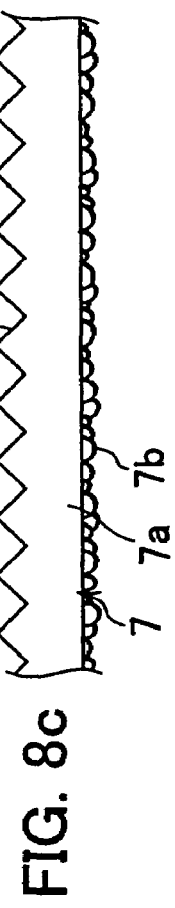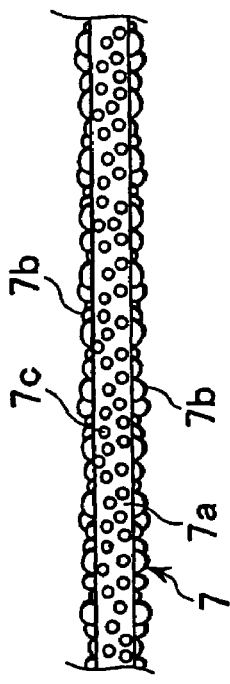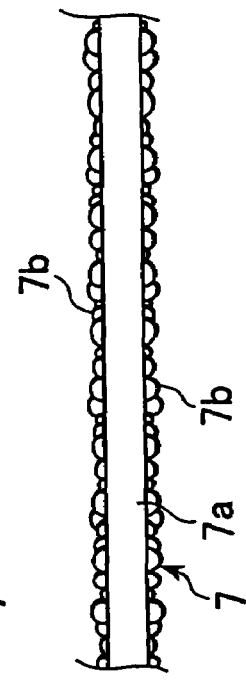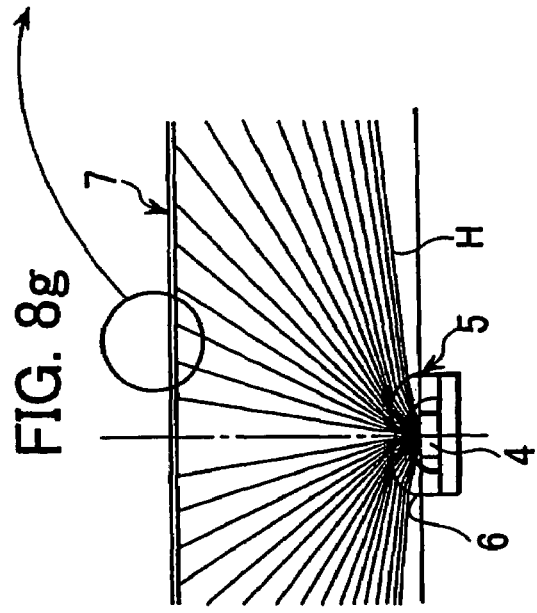

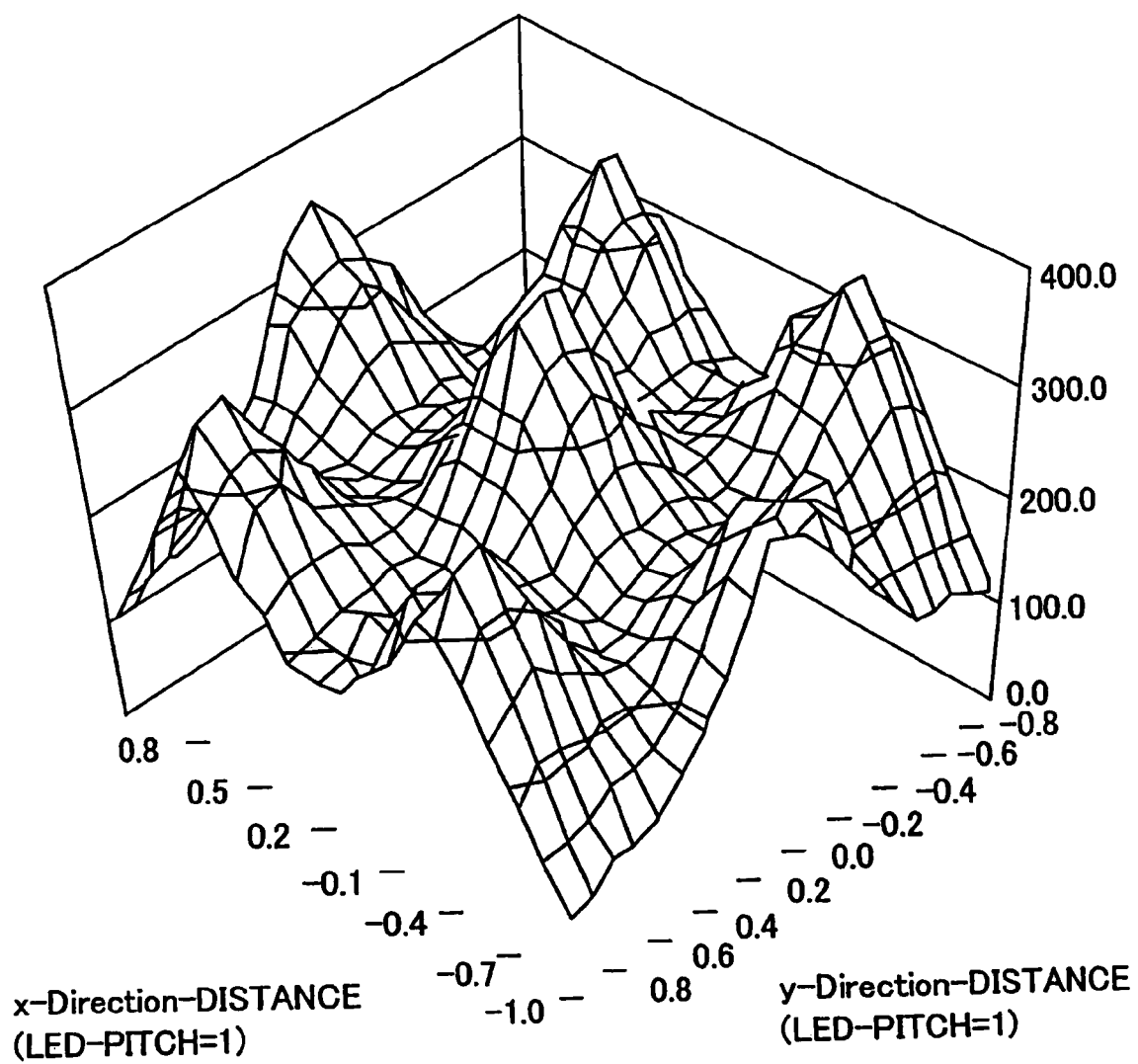

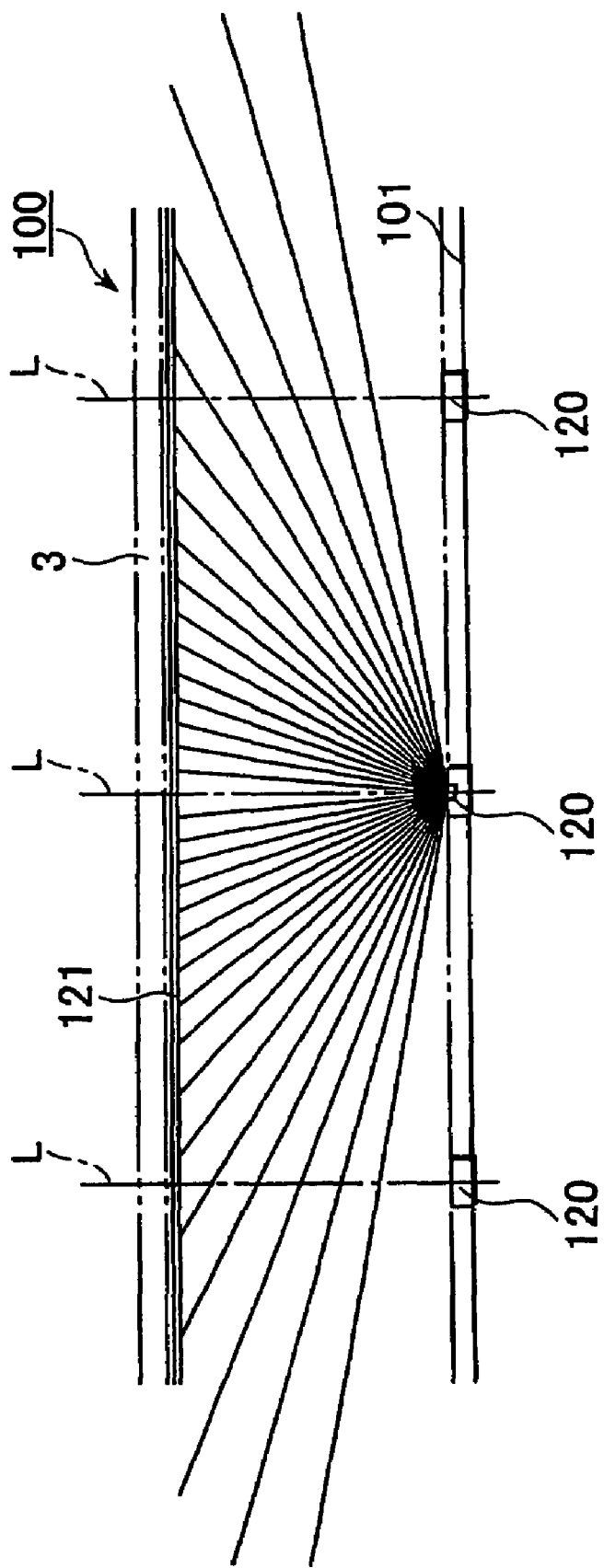

LIGHT EMITTING DEVICE, SURFACE LIGHT SOURCE DEVICE, DISPLAY AND LIGHT FLUX CONTROL MEMBER

BACKGROUND

1. Field of Invention

The present invention relates to a light emitting device, surface light source device, display and a light flux control member, being applied, for example, to a light emitting device or surface light source device 2 for backlighting a display member such as LCD-panel, or to a display composed of a display member and such light emitting device or surface light source device.

Further, the present invention is also applied to a light flux control member used in devices as above. More concretely, a light emitting device, surface light source device, display and light flux control member are employable in displays used as TV-monitors or monitors for personal computers and in backlighting arrangements in the devices. In addition, applications to interior illumination or various illumination are possible.

2. Related Arts

It has been known to employ a surface light source device provided with a light emitting diode (LED) and a plate-like light flux control member, as illumination means for LCD-monitors used in personal computers, TV-sets or the likes. Usually a plurality of LEDs are employed and arranged like a matrix at a back side of a light flux control member. Light from the LEDs enters into the light flux control member through a back face thereof, being emitted from an emission face opposite to the back face. Then a LCD-panel is backlighted by the emitted light. FIG. 19 illustrates an example of display to which such prior arts are applied, being disclosed, for example, in Document 1 noted below. Referring to FIG. 19, conventional display 100 is provided with a light diffusing member (light flux control member) 121, substrate 101 arrange along an inner face of light diffusing 121, a plurality of LEDs (point-like light emitting elements) 120 disposed on substrate 101 at a predetermined pitch and display member (such as LED- panel).

Light from the respective LEDs enters into light diffusing member 121 through an inner face thereof, becoming inner propagation light. This inner propagation light is outputted from an emission face provided by an outer face (i.e. a face opposite to the inner face) of light diffusing member 121, being supplied to a display (such as LCD-panel) 3.

Document 1; Tokkai-Hei 7-191311

However, conventional display 100 gives a large difference in illuminance between locations near to an optical axis of LED 120 and locations far from the optical axis, resulting in being difficult to illuminate display member 3. That is, an illuminance curve of output illumination light shows a conspicuous wave-like undulation corresponding to locations of LEDs 120, as described later by referring to FIGS. 10, 11, 15 and 17. In general, such uneven brightness is not desirable.

OBJECT AND SUMMARY OF INVENTION

An object of the present invention is to solve the above problem of prior art. That is, the present invention aims to improve a light emitting device, a surface light source device and display which employs one or a plurality of point-like light sources as a light emitting source(s) so that unevenness of brightness depending on location of the point-like light source(s) is relaxed. Another object of the present invention is to provide a light flux control member used in those devices.

First, the present invention is applied to a light emitting device comprising a light flux control member via which light from a light emitting element is emitted. According to a basic feature of the present invention, said light flux control member has a recess and an emission control face, said recess being arranged corresponding to said light emitting element and provides a light input portion for causing light emitted from said light emitting element to be inputted into said light flux control member, and said emission control face causing light inputted into said light flux control member to be outputted after inner propagation, and further, said emission control face is configured so that a projection image of said emission control face onto an imaginary plane perpendicular to a datum optical axis of said light emitting device provides a planar outline shape anisotropic around said datum optical axis, and so that the following Conditions 1 to 3 are satisfied.

Condition 1; A relation of $(\theta5/\theta1)>1$ is satisfied except for light of directions angularly near to a direction of said datum optical axis;

Condition 2; Value of $\theta5/\theta1$ (>1) according to the above Condition 1 gets smaller gradually with increasing of $\theta1$).

Condition 3; Value of $\theta5/\theta1$ (>1) according to the above Condition 1 shows dependency on direction around said datum optical axis;

(where $\theta1$ is an angle made by an inner incident light to said emission control face on inner incidence with respect to a line which passes a position of said inner incidence and is parallel to said datum optical axis of said light emitting device, and $\theta5$ is angle made by said inner incident light with respect to said line on being emitted from said emission control face.

Said planar outline shape may have minimum outline portions, which are distant from said datum optical axis by the minimum distance and arranged around said datum optical axis at angular intervals of 90°, and maximum outline portions which are distant from said datum optical axis by the maximum distance and arranged around said datum optical axis and between minimum outline portions adjacent to each other, and further the following Condition 4 is satisfied.

Condition 4; Value of $\theta5/\theta1$ (>1) according to the above Condition 1 get greater, under a condition such that $\theta1$ is not changed, as said direction around said datum optical axis gets nearer from a direction corresponding to a minimum outline portion toward another direction corresponding to a maximum outline portion.

Said light emitting element may be accommodated in said recess. Said light of directions angularly near to said direction of said datum optical axis is preferably light that falls within a range of ±5° with respect to said direction of said datum optical axis.

In addition

A gap may be arranged between a surface of said recess and said light emitting element. Further, said light emitting element may have a sealing portion consisting of sealing material and a gap may be arranged between a surface of said recess and said sealing portion.

Alternatively, a surface of said recess may be tightly in contact with said light emitting element.

Further, said emission control face may have a first emission surface near to said datum optical axis and a second emission surface located around said first emission surface, and a point of inflection is provided by a connection portion between said first emission surface and said second emission surface.

The present invention is also applied to a surface light source device comprising at least one light emitting device and a light diffusion member transmitting and diffusing light from said light emitting device. According to the present invention, the surface light source device employs a light emitting device as provided by any of the above light emitting devices. The present invention is applied to a light flux control member which allows light from a light emitting element to be inputted thereto and emits direction-controlled light, too.

According to the present invention, the light flux control member comprises a recess which is arranged corresponding to said light emitting element and provides a light input portion for causing light emitted from said light emitting element to be inputted into said light flux control member, and an emission control face which causes light inputted into said light flux control member to be outputted after inner propagation, wherein said emission control face is configured so that a projection image of said emission control face onto an imaginary plane perpendicular to an optical axis of said light emitting element provides a planar outline shape anisotropic around said optical axis, and so that the following Conditions 1 to 3 are satisfied.

Condition 1; A relation of $(\downarrow 5/\theta 1)>1$ is satisfied except for light of directions angularly near to a direction of said optical axis;

Condition 2; Value of $\theta 5/\theta 1$ (>1) according to the above Condition 1 gets smaller gradually with increasing of $\theta 1$).

Condition 3; Value of $\theta 5/\theta 1$ (>1) according to the above Condition 1 shows dependency on direction around said optical axis;

(where $\theta 1$ is an angle made by an inner incident light to said emission control face on inner incidence with respect to a line which passes a position of said inner incidence and is parallel to said datum optical axis of said light emitting device, and $\theta 5$ is angle made by said inner incident light with respect to said line on being emitted from said emission control face.

Said planar outline shape may have minimum outline portions, which are distant from said datum optical axis by the minimum distance and arranged around said datum optical axis at angular intervals of 90°, and maximum outline portions which are distant from said datum optical axis by the maximum distance and arranged around said datum optical axis and between minimum outline portions adjacent to each other, and further the following Condition 4 is satisfied.

Condition 4; Value of $\theta 5/\theta 1$ (>1) according to the above Condition 1 get greater, under a condition such that $\theta 1$ is not changed, as said direction around said datum optical axis gets nearer from a direction corresponding to a minimum outline portion toward another direction corresponding to a maximum outline portion.

In addition, said light emitting element may be accommodated in said recess. Further, said light of directions angularly near to said direction of said optical axis is preferably light that falls within a range of ±5° with respect to said direction of said optical axis.

BRIEF DESCRIPTION OF DRAWINGS

FIG. 4c is a left side view of the light flux control member shown in FIG. 4a;

FIG. 4d is a cross section view along line X2-X2 in FIG. 4a;

FIG. 8a is a side view of a first example of light diffusion member;

FIG. 8b is a side view of a second example of light diffusion member;

FIG. 8c is a side view of a third example of light diffusion member;

FIG. 8d is a side view of a forth example of light diffusion member;

FIG. 8e is a side view of fifth example of light diffusion member;

FIG. 8f is a side view of a sixth example of light diffusion member;

FIG. 8g is a partially enlarged cross section view of a display in which a light diffusion member is disposed;

FIG. 12 is a graph showing three-dimensionally an illuminance distribution of light supplied to a member-to-be-illuminated of the display shown in FIG. 1 under a condition such that only one of nine light emitting elements is switched on;

FIG. 13 is a graph showing three-dimensionally an illuminance distribution of light supplied to a member-to-be-illuminated in a prior art shown in FIG. 19 under a condition such that only one light emitting element is switched on;

FIG. 14 is a graph showing three-dimensionally an illuminance distribution of light supplied to the member-to-be-illuminated of the display shown in FIG. 1 under a condition such that all of nine light emitting elements are switched on;

FIG. 15 is a graph showing three-dimensionally an illuminance distribution of light supplied to the member-to-be-illuminated in the prior art shown in FIG. 19 under a condition such that all of nine light emitting elements are switched on;

FIG. 16 is a graph showing three-dimensionally an illuminance distribution of light supplied to a member-to-be-illuminated of the display shown in FIG. 9 under a condition such that all of seven light emitting elements are switched on;

FIG. 17 is a graph showing three-dimensionally an illuminance distribution of light supplied to the member-to-be-illuminated in the prior art shown in FIG. 19 under a condition such that all of seven light emitting elements are switched on;

FIG. 19 illustrates a conventional display;

FIG. 20b is a side view of the light emitting device shown in FIG. 20a;

FIG. 20c is a cross section view along lined X3-X3 in FIG. 20a;

FIG. 21b is a side view of the light emitting device shown in FIG. 21a;

FIG. 21c is a cross section view along lined X4-X4 in FIG. 21a;

EMBODIMENTS

First Embodiment (Skeleton of Surface Light Source Device 2 and Display)

Figure 1:
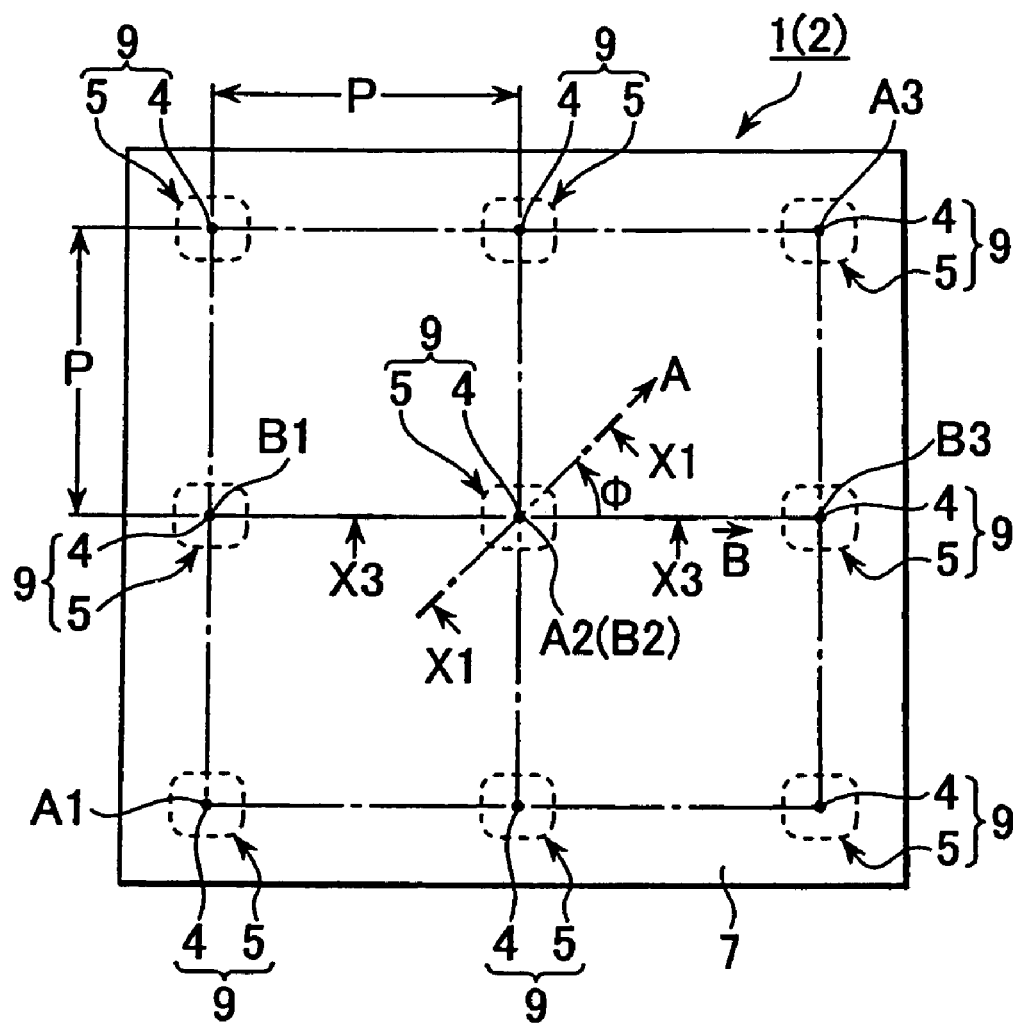
FIG. 1 is a plan view of a surface light source device in accordance with a first embodiment of the present invention and a display employing the surface light source device, with a member-to-be-illuminated (displaying member) being not show.
Figure 2:
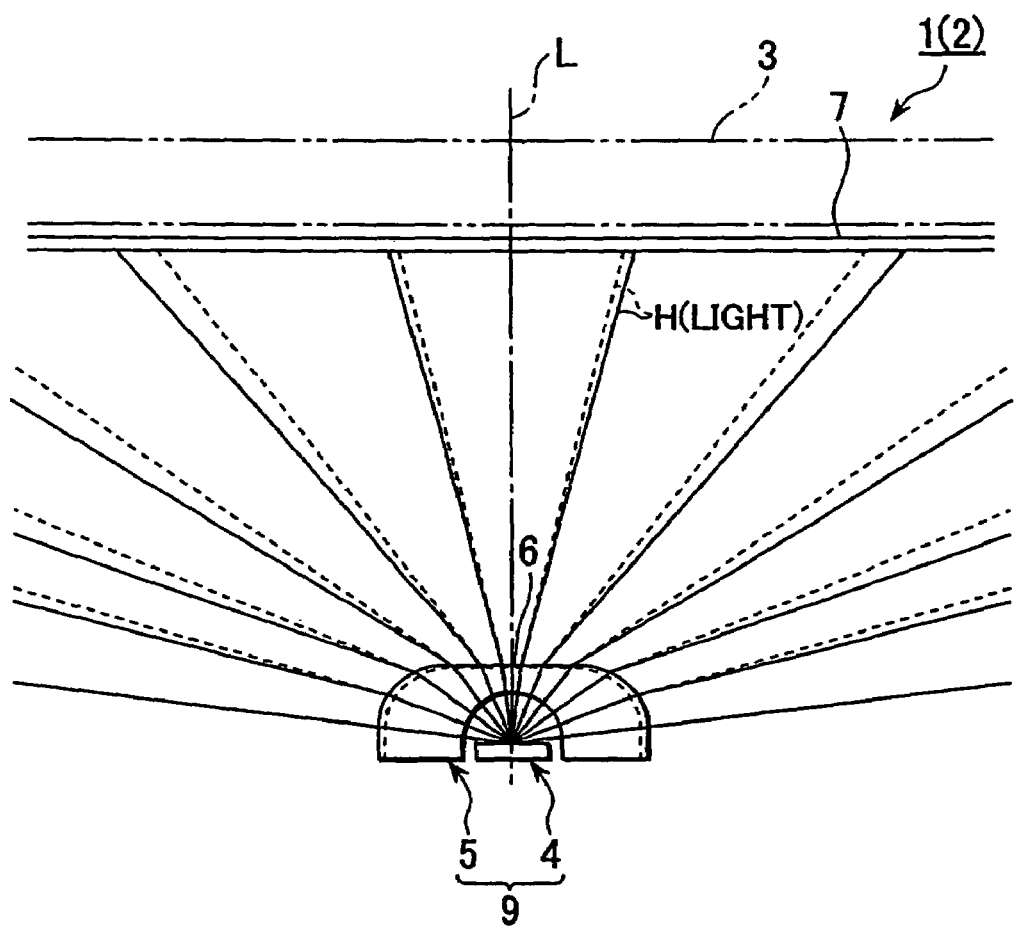
FIG. 2 is a cross sectional diagram for illustrating cross sections of the display along lines X1-X1 and X3-X3 in FIG. 1.
Figure 3:
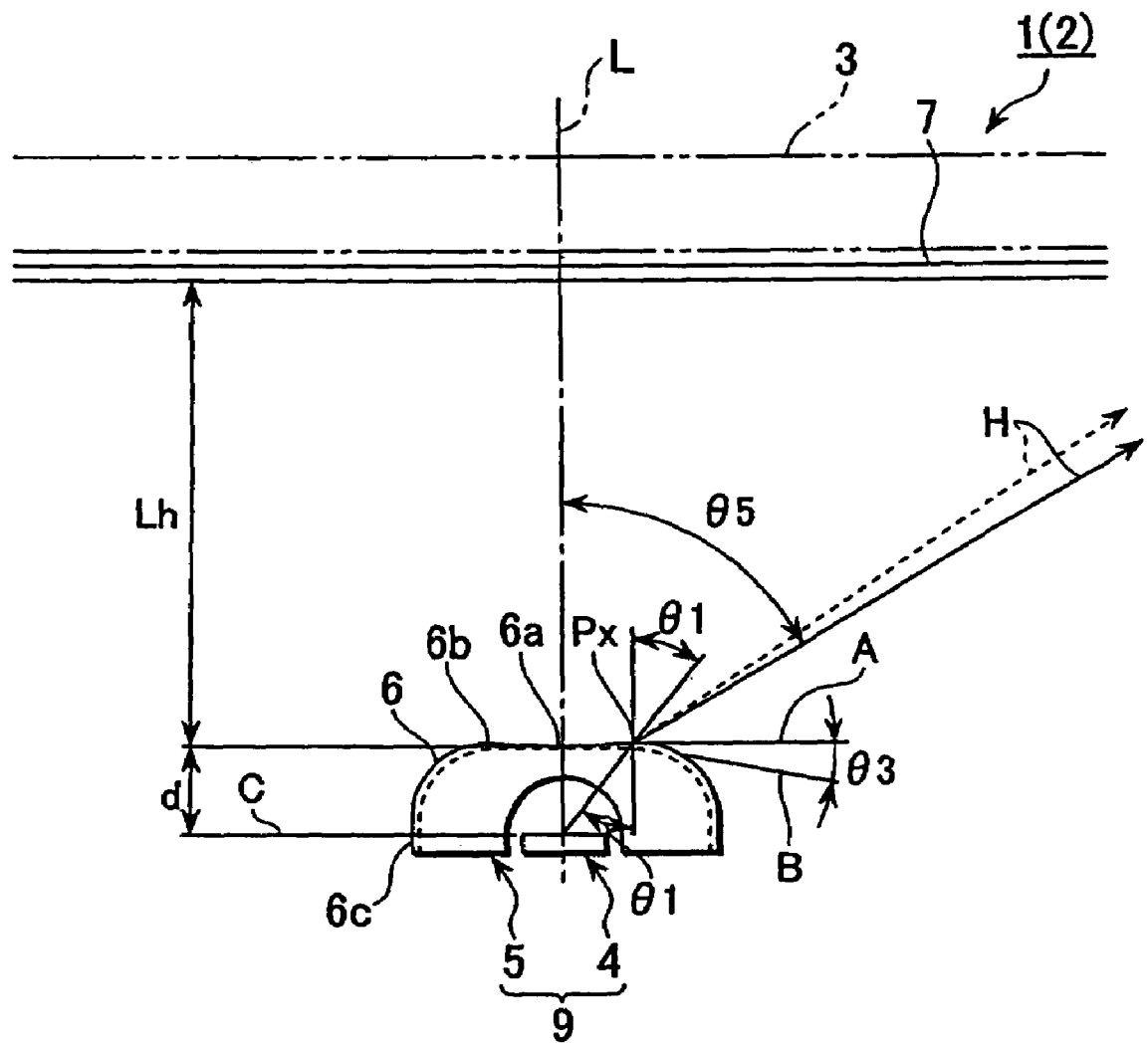
FIG. 3 is a partial cross section view of the display in the first embodiment, illustrating parameters (such as $\theta 1, \theta 3, \theta 5$) in connection with an optical axis of a light emitting element (LED)

FIGS. 1 to 3 illustrate display 1 surface light source device 2 included in display 1. FIG. 1 is a plan view of surface light source device 2 and display 1, with a member-to-be-illuminated (displaying member) being omitted. FIG. 2 is a cross sectional diagram for illustrating cross sections along lines XI-XI and X3-X3 in FIG. 1. FIG. 3 is a partial cross section view of display 1 in the, illustrating parameters (such as θ1 , θ3 , θ5) in connection with a datum optical axis L.

It is noted that "datum optical axis L of light emitting device 9" is defined as "a light traveling direction at a center of a three-dimensional emission flux from light emitting device 9". On the other hand, "optical axis of light emitting element (point-like light source) 4" is defined as "a light traveling direction at a center of a three-dimensional emission flux from light emitting element 4". In this embodiment, "datum optical axis L of light emitting device 9" accords with "optical axis of light emitting element 4". Thus datum optical axis L may be called optical axis L in the description hereafter.

Referring to FIGS. 1 to 3, display 1 comprises surface light source device 2 and member-to-be-illuminated 3. In this example, member-to-be-illuminated 3 is a display member for displaying, being a LCD-panel typically. Accordingly, wording such as display member 3 or LCD-panel 3 may be used instead of member-to-be-illuminated 3 hereafter. Display member 3 is supplied with illumination light for displaying from surface light source device 2.

Surface light source device 2 comprises light diffusion member 7 and a plurality of light emitting devices 9. Each light emitting device 9 comprises a single light flux control member 5 and a single light emitting element (point-like light source; such as LED) 4. In general, a single light emitting device 9 may comprise a plurality of light flux control member 5 and a plurality of LEDs (point-like light sources). Further, surface light source device 2 may be, in general, composed of light diffusion member 7 and a single light emitting device 9.

Light emitting device 9 employed in this example comprises an arrangement of light emitting elements 4 disposed at a generally constant interval (pitch P) at the back side of light diffusion member 7.

(Light Flux Control Member)

Figure 4C:
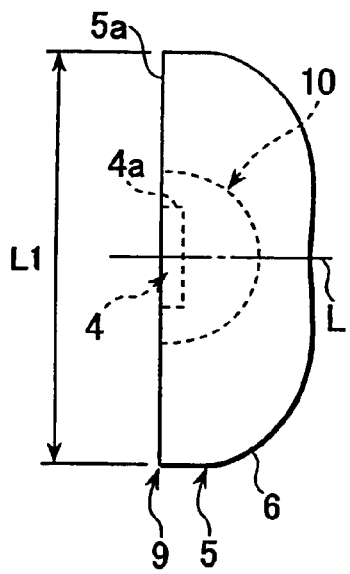
Figure 4A:
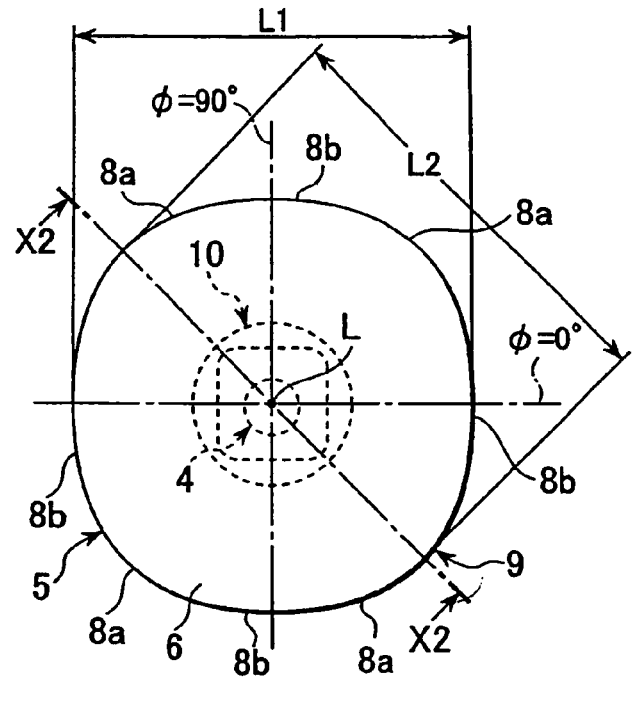
FIG. 4a is a plan view of a light flux control member employable in the first embodiment.
Figure 4B:
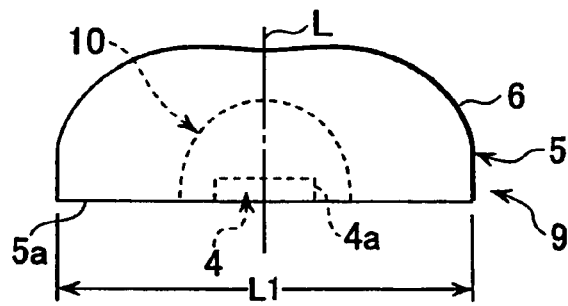
FIG. 4b is a side view of the light flux control member shown in FIG. 4a, as viewed from a lower side thereof.

FIG. 4a is a plan view of light flux control member 5 and FIG. 4b is a side view of the light flux control member shown in FIG. 4a as viewed from a lower side thereof. In addition, FIG. 4c is a left side view of the light flux control member shown in FIG. 4a and FIG. 4d is a cross section view along line X2-X2 in FIG. 4a.

Configuration of light flux control member 5 would be understood from FIGS. 4a to 4d. Light flux control member 5 is made of a transparent resin material such as PMMA (polymethyl methacrylate), PC (poly carbonate), EP (epoxy resin). Transparent glass may be employed.

As shown in FIGS. 1 and 4a, light flux control member 5 has a planar shape like a rectangle deformed as to be round somewhat. Four corners 8a have curved faces 8a which are bridged by curved faces 8b to provide the planar shape. Each curve face 8a is curved face of a relatively small radius of curvature, 8b (i.e. sharply curbed dace) and each curve face 8b is curved face of a relatively large radius of curvature, 8b (i.e. gently curbed dace).

Figure 4D:
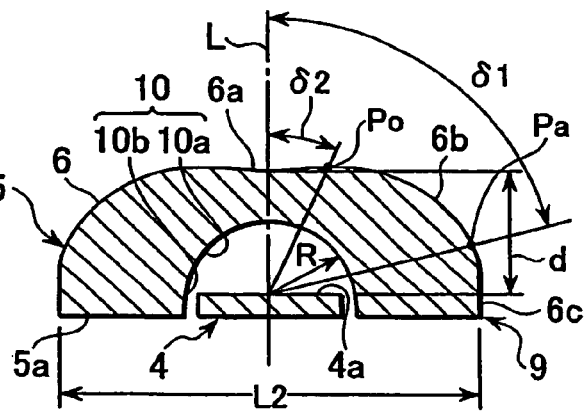

As understood easily from illustrations of FIGS. 4b to 4d, light flux control member 5 has an outer face providing emission face 6 swelling like a plateau.

Now provided that this emission face 6 is projected onto an optional imaginary plane perpendicular to optical axis L, an outline shape is obtained. An example of imaginary plane is a plane on which lower face 5a (flat portion) of light flux control member 5 shown in FIG. 4d extends. In other words, this outline shape is a shape which is viewed from a location fully far above light flux control member 5 (for example, from above in FIG. 4d).

In the instant specification, a planar shape of an emission face of a light flux control member defined as above is called "planar outline shape" or simply "planar shape ".

According to a basic feature of the present invention, a light flux control member has an emission face "planar shape" of which is provided by surrounding optical axis L anisotropically. In other words, the "planar shape" gives a change depending on direction, at least partially, to distance from optical axis L on an imaginary plane perpendicular to optical axis L (i.e. no true circle is depicted).

In the case of this example, emission face 6 of light flux control member 5 has a planar shape as depicted in FIG. 4a. As shown in FIG. 4a, (sharp) curved faces 8a, 8a opposite to each other give a dimension L2 (dimension between side faces of diagonal directions in FIG. 4a) which is larger than dimension L1 (dimension between side faces of rectangular axes in FIG. 4a) made bay (gentle) curved faces 8b, 8b opposite to each other.

Emission face 6 of light flux control member 5 is a face which causes light inputted into light flux control member 5 to be emitted after inner propagation, controlling directions of the emitted light as described later. Thus emission face 6 is called "emission control face 6".

Light flux control member 5 provides a planar shape which has minimum outline portions (portions at which curved faces 8b are located) positioned at the minimum distance from optical axis L at intervals of 90° around optical axis L. These minimum outline portions 8b can be called "nearest portions" with respect to optical axis L. There are maximum outline portions positioned at the largest distance from optical axis L (portions at which curved faces 8a are located) between minimum outline portions 8b, 8b adjacent to each other.

These maximum outline portions 8a can be called "farthest portions" with respect to optical axis L. Distance L2 between maximum outline portions opposite to each other is larger than L1 between minimum outline portions opposite to each other.

Such a planar shape is an example of "planar shape which is not true circle". This light flux control member 5 has an inner face and outer face, being provided with a semi-sphere-like recess, as shown in FIG. 4d, having a radius R with a center corresponding to light emitting center of light emitting element 4 on the inner face (i.e. lower face in FIG. 4d).

Recess 10 provides a light input portion for allowing light from light emitting element 4 corresponding thereto to be inputted.

Recess 10 is positioned at a center of a back face side of light flux control member 5 as shown in FIGS. 4a and 4d, being provided with first internal circumference 10a and second internal circumference 10b. First internal circumference 10a is located at an upper side with respect to light emitting face portion 4a of light emitting element 4, being formed like a semi-sphere with a center corresponding to the light emitting center.

On the other hand, second internal circumference 10b is located at a lower side with respect to light emitting face portion 4a of light emitting element 4, extending downward from a lower end of first internal circumference 10a to provide a cylinder-like portion opened on lower face 5a of light flux control member 5.

There is a space between light emitting element 4 and first and second internal circumferences 10a, 10b.

Emission control face 6 is formed on the outer face of light flux control member 5, consisting of first emission face 6a extending within a range of a predetermined distance from optical axis L and second emission face 6b formed continuously around first emission face 6a.

First emission face 6a is formed of a smoothly curved surface convex downward as shown in a cross section view of FIG. 4d. Second emission face 6b is formed of a smoothly curved surface convex upward continuously adjacent to first emission face 6a, as shown in a cross section view of FIG. 4d, being formed as to surround first emission face 6a.

These first and second emission faces 6a and 6b are connoted smoothly to each other, providing point of inflection Po at a connection portion of first and second emission faces 6a, 6b.

In addition, third emission face 6c connecting second emission face 6b to lower face 5a of the back face at an outer periphery side of second emission face 6b, as shown in a cross section view of FIG. 4d.

Although third emission face 6c provides a curved surface smoothly connecting second emission face 6b to a flat portion of lower face 5a as shown in FIG. 4d, this is merely an example. A side face perpendicular to the flat portion of lower face 5a may be formed partially so far as configuration does not spoil broad and uniform emission from light flux control member 5.

Now symbols are defined as follows by referring to FIGS. 3 and 4a to 4d illustrating emission control face 6 of light flux control member 5 in details.

δ 1; Angle made by connection point P a between emission faces 6b and 6c with respect to optical axis L.

δ 2; Angle made by point of inflection Po with respect to optical axis L.

C; Horizontal plane perpendicular to optical axis L of light emitting element 4, called reference plane H; Light which is emitted from light emitting element 4 and enters into light flux control member 5 through recess 10, then being emitted from emission control face 6 after inner propagation (light path of ray).

P x ; Position at which light H is emitted from emission control face 6 (a crossing point between light and emission control face 6 in a cross section shown in FIG. 3).

A; Line which passes position P x and is parallel to reference plane C.

θ 1; Angle made by light H at inner incidence to emission control face 6 with respect to a line which passes a position of said inner incidence and is parallel to optical axis L (in general, said datum optical axis) in FIG. 3. (For the sake of convenience of description, this angle θ1 is called "emission angle" of light emitting element 4 or "LED-emission-angle".

θ 3; Angle made by tangent line B of emission control face 6 at position P x with respect to line A in FIG. 3. (For the sake of convenience of description, this angle θ3 is called "lens-inclination angle".)

θ5; Emission angle from emission control face 6 (Angle made by light H at being emitted from emission control face 6 with respect to optical axis L)

φ; Angle expressing direction around optical axis L in general, said datum optical axis of light emitting device 9), which is called "direction angle" hereafter. Relations between direction angle φ and maximum outline portions (portion corresponding to curved faces 8a) and relation between direction angle φ and minimum outline portions (portions corresponding to curved faces 8b) are shown in FIG. 4a.

Further, "half-intensity-angular-range" is defined for light emitting element (point-like light source) 4 in order to describe 0optical conditions which have to be satisfied by emission control face 6 of light flux control member 5.

In general, light emitting element 4 emits light of the maximum intensity toward a direction of optical axis L. Since the light emitting center of light emitting element 4 is located at the center of semi-sphere-like recess 10 in FIG. 3, light of the maximum intensity enters into light flux control member 5 at the deepest position of recess 10, being inner-incident to emission control face 6 after inner propagation along optical axis L. This gives angle θ1=0.

On the other hand, light other than the maximum intensity enters into light flux control member 5 at other positions of recess 10, being inner-incident to emission control face 6 after inner propagation.

This gives angle θ1 (absolute value )>0. In general, Emission intensity gets smaller with an angular deviation from optical axis L due to emission intensity characteristics of light emitting element 4.

Thus "half-intensity-angular-range" is defined as an angular range from a direction of the maximum intensity (i.e. direction of optical axis L=a normal direction of reference plane C) to an angle at which intensity falls to a half (50%).

In this case, since emission rays of light emitting element 4 can be regarded as straightly travelling rays until inner-incidence to emission control face 6, emission directions from light emitting element 4 can be expressed by angle θ1.

Half-intensity-angular-range can be expressed by 0≦θ1≦+θ half because emission intensity direction characteristics of light emitting element 4 are generally isotropic (i.e. symmetric with respect to optical axis L). It is noted that θ half is a value of angle θ1 corresponding to a direction which gives 50% intensity of the maximum emission intensity.

Emission control face 6 of light flux control member 5 is configured so that the following Conditions 2, 2 are satisfied for light at that is emitted from light emitting element 4 corresponding to said emission control face 6 and falls within "a certain angle range at least including half-intensity-angular-range" (i.e. θ<δ1 in FIG. 3).

Condition 1; A relation of (θ5/θ1)>1 is satisfied except for light of directions angularly near to a direction of optical axis L (in general cases, datum optical axis). It is noted that "directions angularly near" generally means directions within small angles, preferably an angular range (0≦θ1≦5°) of within 5° (within ±5), with respect to optical axis L (in general cases, datum optical axis).

Condition 2; Value of θ5/θ1 (>1) according to the above Condition 1 gets smaller gradually with increasing of θ1).

Condition 3; Value of θ5/θ1 (>1) according to the above Condition 1 shows dependency on direction (direction angle φ) around optical axis L at a position of inner-incidence of light H. That is, being constant over all directions (0°≦φ<360°) is not satisfied (any change is provided at least partially).

In particular, light flux control member 5 shown in FIGS. 4a to 4d satisfies the following Condition 4 as an example of Condition 3.

Condition 4; Value of θ5/θ1 (>1) according to the above Condition 1 gets greater, under a condition such that θ1 is not changed, as direction around optical axis L at a position of inner-incidence of light H gets nearer from a direction corresponding to a minimum outline portion (curved faces 8b) toward another direction corresponding to a maximum outline portion (curved faces 8a).

Figure 5:
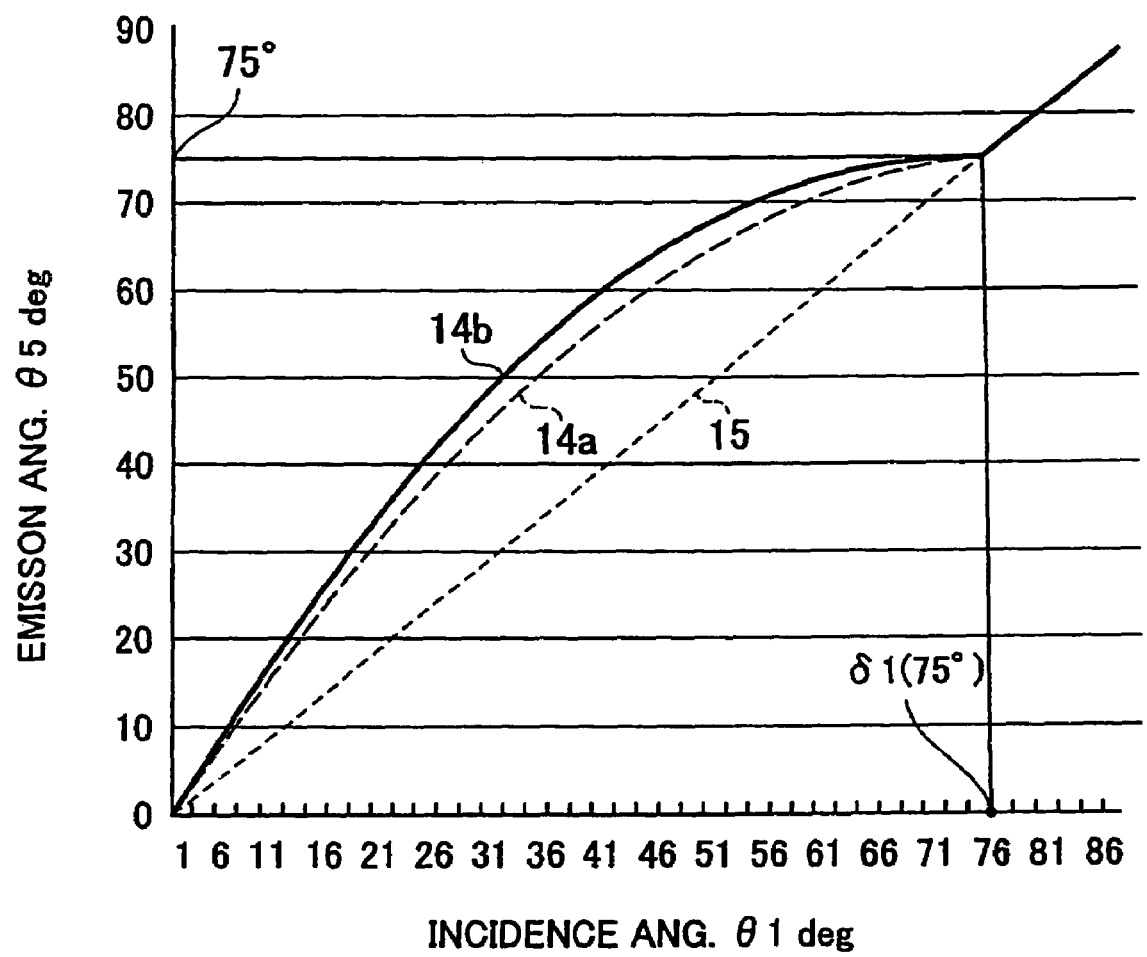
FIG. 5 is a graph illustrating a relation between LED-emission angle $\theta 1$ and emission angle $\theta 5$ for a light flux control member.

FIG. 5 is a graph illustrating a relation between incidence angle θ1 and emission angle θ5 for light flux control member 5. FIG. 7a is a graph for giving an explanation about coefficient α expressing degree of diverging of light flux control member 5, showing a relation between direction angle φ and coefficient α expressing degree of diverging.

Figure 7B:
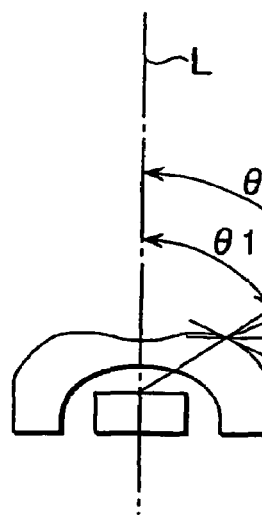
FIG. 7b illustrates parameters in an illustration way like that of FIG. 3.
Figure 7C:
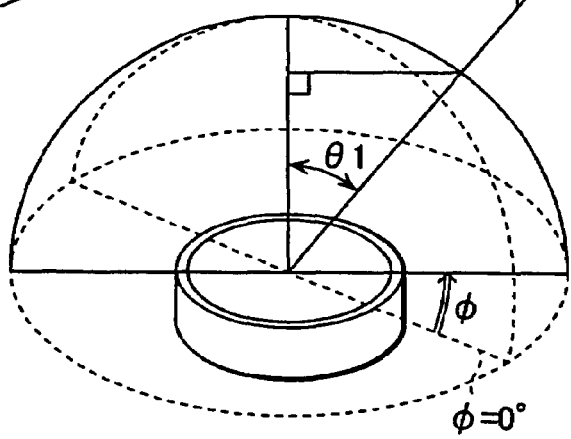
FIG. 7c illustrates direction angle $\phi$; parameters in an illustration way like that of FIG. 3.
Figure 7A:
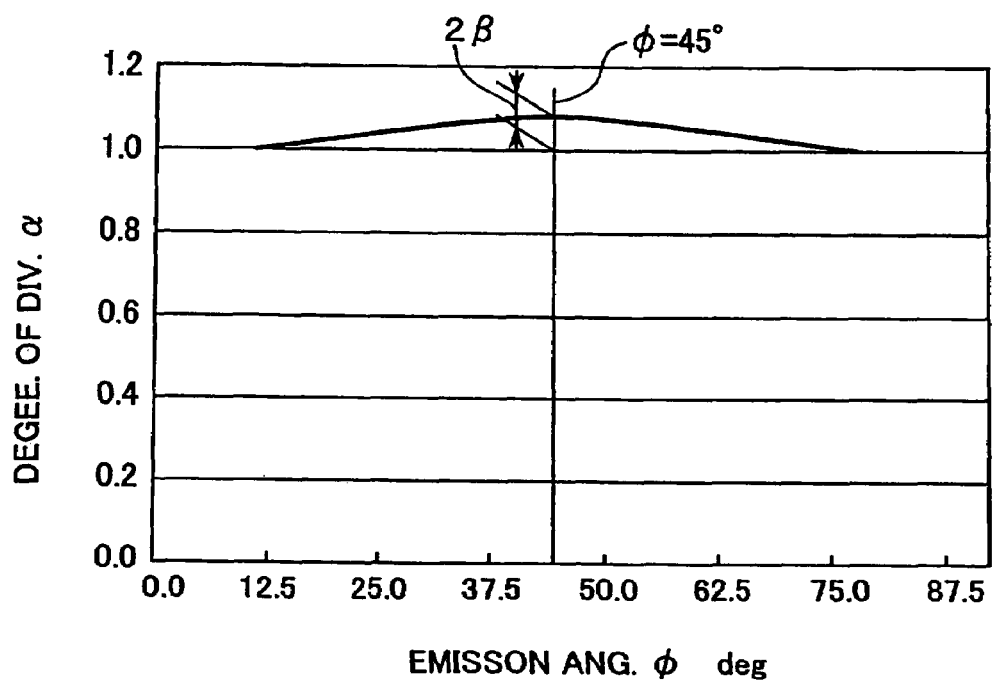
FIG. 7a is a graph for giving an explanation about coefficient $\alpha$ expressing degree of diverging of a light flux control member employed in the present invention, showing a relation between direction angle $\phi$ and coefficient $\alpha$ expressing degree of diverging.

In addition, FIG. 7b illustrates parameters in an illustration way like that of FIG. 3, and FIG. 7c illustrates direction angle φ. It is noted that a relation between direction angle φ and maximum outline portions (portions corresponding to curved faces 8a) and a relation between direction angle φ and minimum outline portions (portions corresponding to curved faces 8b) are shown in FIG. 4a.

It is noted that coefficient a expresses degree of diverging ((i.e. ability of diverging propagation directions of light) of light flux control member 5, being normalized so that α=1 is satisfied at a direction that makes the maximum diverging ability the smallest (i.e. φ=0°).

In FIG. 5, dotted line 15 is a line expressing a relation of (θ5/θ1)=1 and curved line 14a relation between θ1 and θ5 under φ=0° and 90° in FIGS. 4a and 7a. Further, in FIG. 5, curved line 14b relation between θ1 and θ5 under φ=45° in FIGS. 4a and 7a.

As described above, direction characteristics of emission from emission control face 6 show a change depending on direction (angle φ) around optical axis L. In other words, direction characteristics of light emitting device 9 is anisotropic with respect to optical axis L (in general cases, datum optical axis). Anisotropy generated as above correspond to foresaid anisotropy of "planar outline shape" of emission control face 6.

In a range of θ1<δ1 ((i.e. in the foresaid certain range), θ5 can be expressed as the following Formula 1 and θ3 can be expressed as the following Formula 2. It is noted that n is refractive index of an optical material of which light flux control member 5 is made.

$$\theta 5 = [1+\{(\delta 1 - \theta 1) \times \alpha / \delta 1\}] \times \theta 1 \quad \text{(Formula 1)};$$

$$\theta 3 = \tan^{-1}[(\sin \theta 5 - n \cdot \sin \theta 1)/(\cos \theta 5 - n \cdot \cos \theta 1)] \quad \text{(Formula 2)};$$

Figure 6:
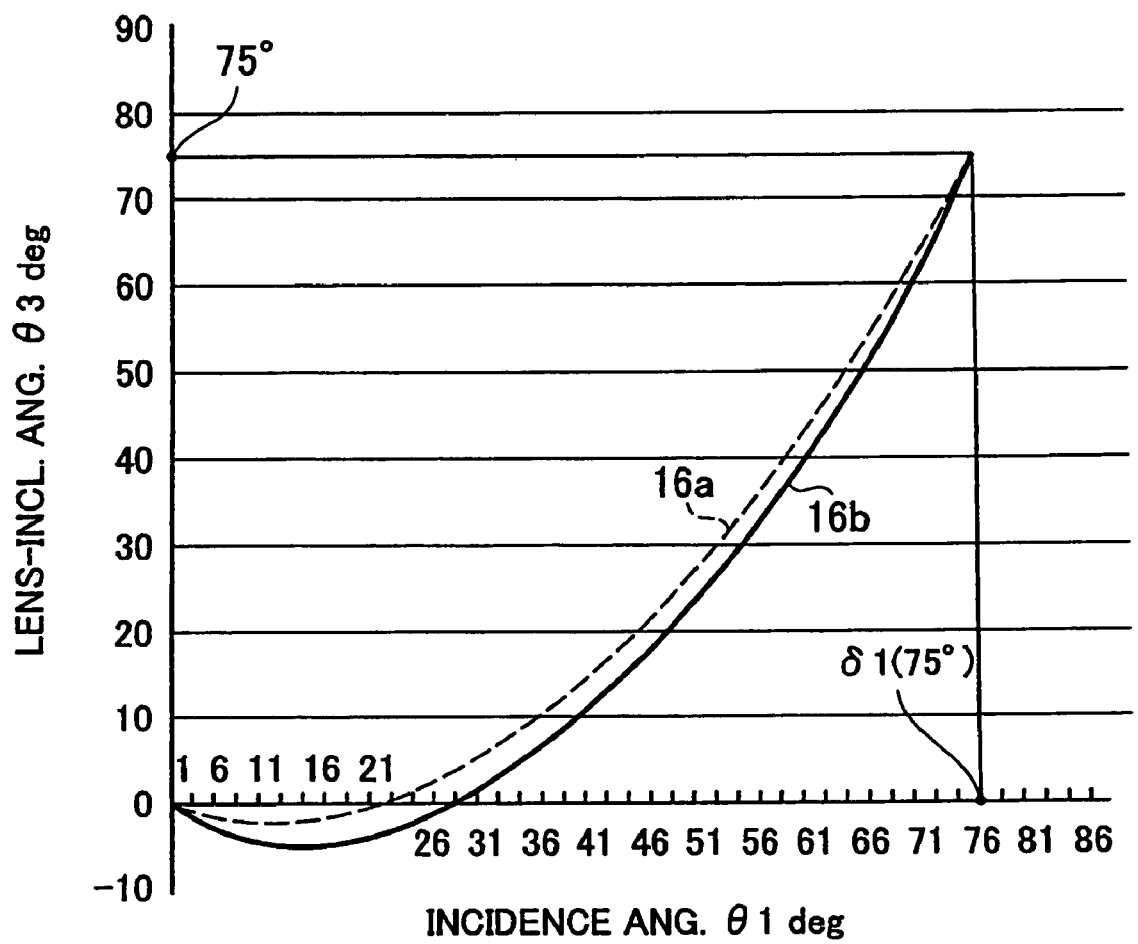
FIG. 6 is a graph illustrating a relation between LED-emission angle $\theta 1$ and lens inclination angle $\theta 3$ for a light flux control member.

FIG. 6 is a graph illustrating a relation between emission angle θ1 and lens-inclination angle θ3 for light flux control member 5. As shown by curved lines 16a, 16b in FIG. 6, θ3 calculated as above gets smaller gradually in a range from a vicinage of optical axis L to a point of θ1=δ2 with increasing of θ1, then getting larger gradually in a range of θ1>δ2 ((See FIG. 4d) with increasing of θ1.

Further, θ3=θ1 is satisfied when θ1 accords with δ1. Curved line 16a in FIG. 6 shows a relation between θ1 and θ3 under direction angle φ=0° and 90° in FIGS. 4a and 7a. In addition, curved line 16b in FIG. 6 shows a relation between θ1 and θ3 under direction angle φ=45° in FIGS. 4a and 7a.

Next, coefficient α shows a change depending on direction angle φ((See FIG. 4a) as illustrated in FIG. 7a. The maximum is obtained at a certain direction φ between φ=0° and φ=90° (φ(0°<φ<90°; φ=45° in FIG. 7a).

As shown in FIG. 7a in details, coefficient α in this embodiment shows a change expressed by a sine-curve, giving the minimum α=1.0 (αmin) under direction angle φ=0° and 90° and giving the maximum α=1.1 (αmax) under direction angle φ=45°.

If an expressing of αmax−αmin=2β is used, this embodiment give 2β=0.1.

FIG. 7b is a diagram corresponding to FIG. 3, and FIG. 7c shows a relation between a light emitting center of LED and direction angle φ.

It is noted that emission angle from light emitting element 4 (See FIG. 7b) accords with incidence angle to emission control face 6 of light flux control member 5 (See FIG. 3), being θ1, because recess 10 accommodating light emitting element 4 employed in this embodiment is formed like a semi-sphere with a center corresponding to the light emitting center of light emitting element 4 as described previously.

If recess 10 is not formed like a semi-sphere, emission control face 6 is configured so that incidence angle θ1 satisfies the foresaid relation between θ1 and θ5 and relation between θ1 and θ3.

Next, coefficient α can be expressed by the following Formula 3 in a range of φ>1 (90°≧φ>φ1). Further, coefficient α can be expressed by the following Formula 4 in a range of φ≦1 (0°φ≦φ1). It is noted that φ1=45° is set.

$$\alpha = \alpha' - \sin\left[\pi \times \frac{\phi - \phi 1}{(\pi/2) - \phi 1} - (\pi/2)\right] \times \beta \quad \text{(Formula 3)}$$

(where φ1 = (π/4), α' = 1.05, β = 0.05.);

$$\alpha = \alpha' - \sin\left[\pi \times \frac{\phi 1 - \phi}{\phi 1} - (\pi/2)\right] \times \beta \quad \text{(Formula 4)}$$

(where φ1 = (π/4), α' = 1.05, β = 0.05.);

Now described is operation of emission control face 6 of light flux control member 5 by referring mainly to FIGS. 2 and 3. Light H from light emitting element 4 is emitted from emission control face 6 to an external region (air) according to Snell's Law after inner propagation within light flux control member 5. This emission is directed toward a desired irradiation range enlarged smoothly as compared with a case of Prior Art shown in FIG. 19.

CONCRETE EXAMPLE

First, described is a concrete example of light emitting device 9 employing light flux control member 5 in accordance with the present invention by referring to FIGS. 4a to 4d. Outline dimensions L1, L2 of light flux control member 5 (emission control face 6), shapes of first and second emission faces 6a, 6b and others shown in these illustrations are designed under consideration of some conditions.

The conditions may include, for example, light emitting characteristics of light emitting element 4 (such as expanse angle of light emitting element 4 which is expressed by the foresaid "half-intensity-angular-range"), thickness d of light flux control member 5 along a direction of optical axis L (in particular, distance from light emitting face portion 4a of light emitting element 4 to first emission face 6a of emission control face 6 along optical axis L), pitch between individual light emitting elements 4 p, distance Lh from emission face 6 (first emission face 6a) to light diffusion member 7 along optical axis L, refractive index n, radius R of the sphere shape provided by recess 10 and others.

According to a concrete example, light flux control member 5 is constituted as follows.

(1) refractive index n=1.49 (resin material)
(2) Recess 10 is configured like a sphere.
(3) L1=7. 17 mm, L2=7. 71 mm
(4) d=2. 3 mm, R=1. 5 mm, Lh=24 mm, p=45 mm
(5) δ 2 varies gradually with a change of φ from φ=0° to φ=90°, making θ1=δ2=12° under φ=0°0 and 90°, and θ1=δ 2=13° under φ=45°.
(6) θ1=δ 1=75° is satisfied at a connection portion between second emission face 6b and third emission face 6c.

Other Embodiments

Modification may be applied to the above-described embodiment as follows.

(i) Light flux control member 5 may has emission control face 6 which is, partially of overall, a matted surface to promote light diverging through light diffusion effects.

(ii) Light flux control member 5 may be provided with light scattering ability within the same. Inside light scattering ability is obtained by dispersing silicone particles or titan oxide in light flux control member 5.

(iii) Coefficient α may have characteristics other than those shown in FIG. 7a. For example, allowed is a design such that optimum values are realized in a range(s) of 0°<φ1<90°, (90°<1<φ1<180°, 180°<φ1<270°, 270°<φ1<360°).

(iv) Coefficient α in the above embodiment varies smoothly according to the sine-curve shown in FIG. 7a. However, coefficient α may show variations like curved or linear lines (variation depending on direction angle φ) according to conditions required. This may involve a change of the foresaid planar outline shape (rectangle deformed as to be round somewhat) to another shape.

(v) In the above embodiment, nine light emitting devices 9, three at longitudinal pitch and three at traversing pitch equal to longitudinal pitch, as shown in FIG. 1. However, this is merely an example. For example, as shown in FIG. 9, seven light emitting devices 9 may be arranged so that a constant pitch is provided between light emitting devices 9 adjacent to each other.

Figure 9:
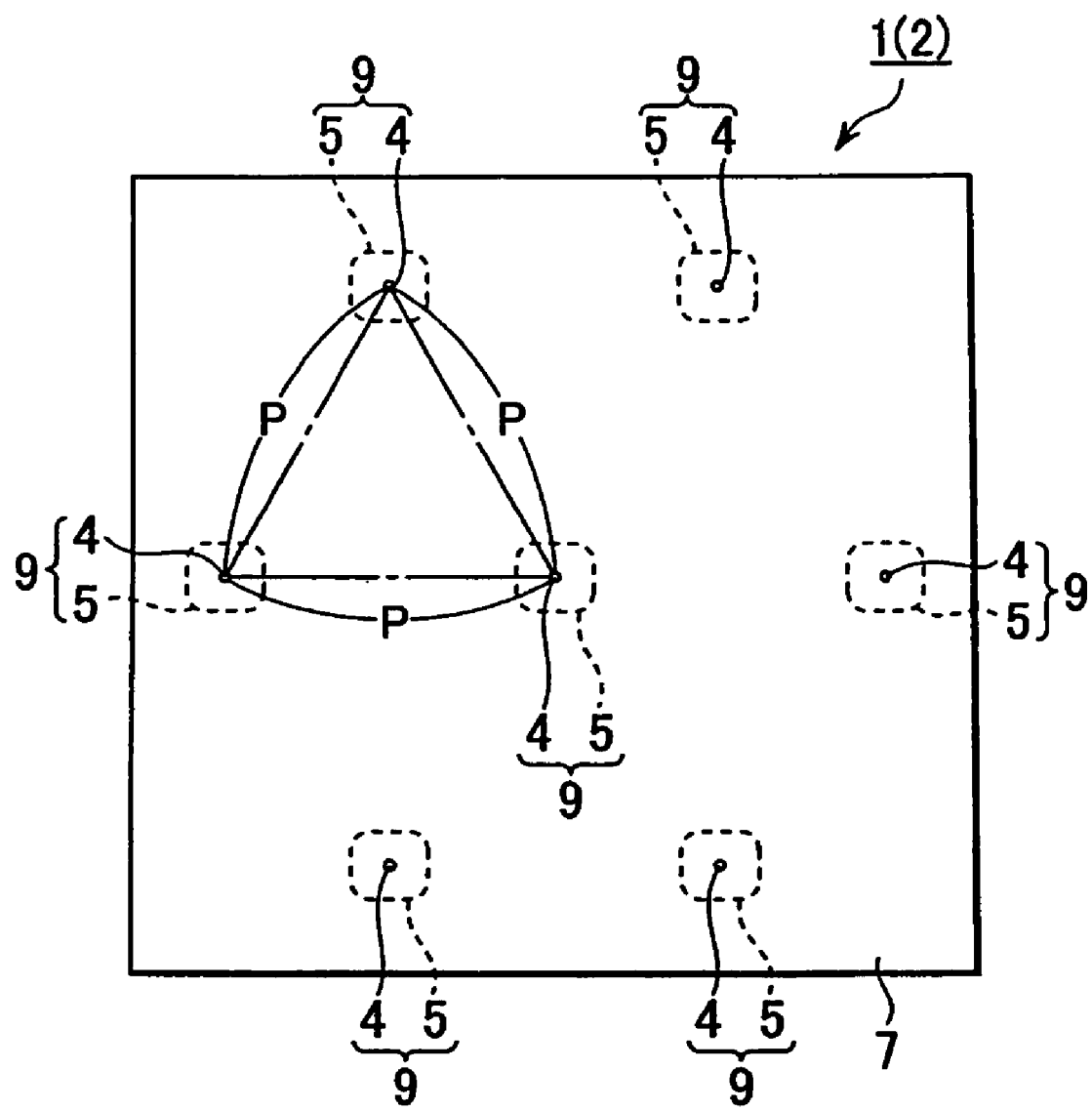
FIG. 9 is a modification of display to which the present invention is applicable.

Comparing display 1 shown in FIG. 9 with display 1 shown in FIG. 1, the latter enables corner parts are irradiated brightly because light emitting devices 9 are disposed at locations corresponding to corner parts. On the other hand, in the case of display 1 shown in FIG. 9, less illumination light reaches corner parts as compared with display 1 shown in FIG. 1 because no light emitting device 9 is disposed at locations corresponding to corners.

(vi) Resin may be filled up into a gap between light emitting element 4 and recess 10 of light flux control member 5 to cancel the gap. In this case, the resin can be regarded as a part of light emitting element 4.

(Light Diffusion Member)

FIGS. 8a to 8f are enlarged side views of examples (first to sixth examples) of light diffusion members 7 employable in display 1 in accordance with the embodiment. FIG. 8g is a partially enlarged cross section view of a display in which a light diffusion member is disposed.

Each light diffusion member 7 is a sheet--like or plate-like member made of light well-permeable resin such as PMMA or PC. A planar shape and area size of each light diffusion member 7 are generally equal to those of member-to-be-illuminated 3 (such as LCD-panel, advertising panel or mark display panel).

First Example

As shown in FIG. 8a, employed is a sheet-like base material 7a both faces of which processing for giving light diffusion ability, such as emboss-processing or bead-coating, is applied, thereby both faces of light diffusion member 7 made provided with fine uneven configurations 7b, 7b. Such fine uneven configurations 7b, 7b cause light diffusion.

Second Example

As shown in FIG. 8b, employed is a sheet-like base material 7a within which light diffusive material 7c is dispersed, and processing for giving light diffusion ability, such as emboss-processing or bead-coating, is applied to both faces of base material 7a to form fine uneven configurations 7b, 7b thereon. Such fine uneven configurations 7b, 7b cause light diffusion.

Third Example

As shown in FIG. 8c, employed is sheet-like base material 7a has a face, directed to light flux control member 5, to which processing for giving light diffusion ability, such as emboss-processing or bead-coating is applied to form a fine uneven configuration 7b. The other face of light diffusion member 7 is provided with a great number of successively arranged prismatic projections 7d extending along a direction perpendicular to the paper surface. Prismatic projections 7d are shaped like triangles (typically, isosceles triangles). Prismatic projections 7d has a function of redirecting light so that light travelling directions come near to a frontal direction while fine uneven configurations 7b cause light diffusion.

Forth Example

As shown in FIG. 8d, light diffusion member 7 is the same as one shown in FIG. 8c except that light diffusive material 6c is dispersed within base material 7a. In the same manner as the case of FIG. 8c, processing such as emboss-processing or bead-coating is applied to one face directed to light flux control member 7 to form a fine uneven configuration 7b. The other face of light diffusion member 7 is provided with a great number of successively arranged prismatic projections 7d.

Although prismatic projections 7d shown in FIGS. 8c and 8d have cross sections like isosceles triangles, these are merely examples. For example, prismatic projections 7d may have cross sections like triangles other than isosceles triangles.

Fifth Example

As shown in FIG. 8e, light diffusion member 7 employs sheet-like base material 7a on an emission side face of which a plurality of circular-cone-like projections 7e are formed. Projections 7e cause light transmitted through base material 7a to be diffused.

Sixth Example

As shown in FIG. 8f, light diffusion member 7 employs sheet-like base material 7a on an emission side face of which pyramid-like (such as triangle-pyramid-like, quadrangle-pyramid-like or hexangle-pyramid-like) projections 7f are formed. Projections 7f cause light transmitted through base material 7a to be diffused.

Every example of light diffusion member 7 is arrange outside of light flux control member 5 (in light paths of emission), as shown in FIG. 8g, transmitting and diffusing light inputted therein and supplying uniformalized light to member-to-be-illuminated 3.

It is noted that light diffusion member 7 may be mounted on a LED-directed side face of member-to-be-illuminated 3. Alternatively, it may be interposed between light flux control member 5 and member-to-be-illuminated 3 as a independent member (separately from member-to-be-illuminated 3).

(Emission Quantity of Light from Light Diffusion Member)

Figure 10:
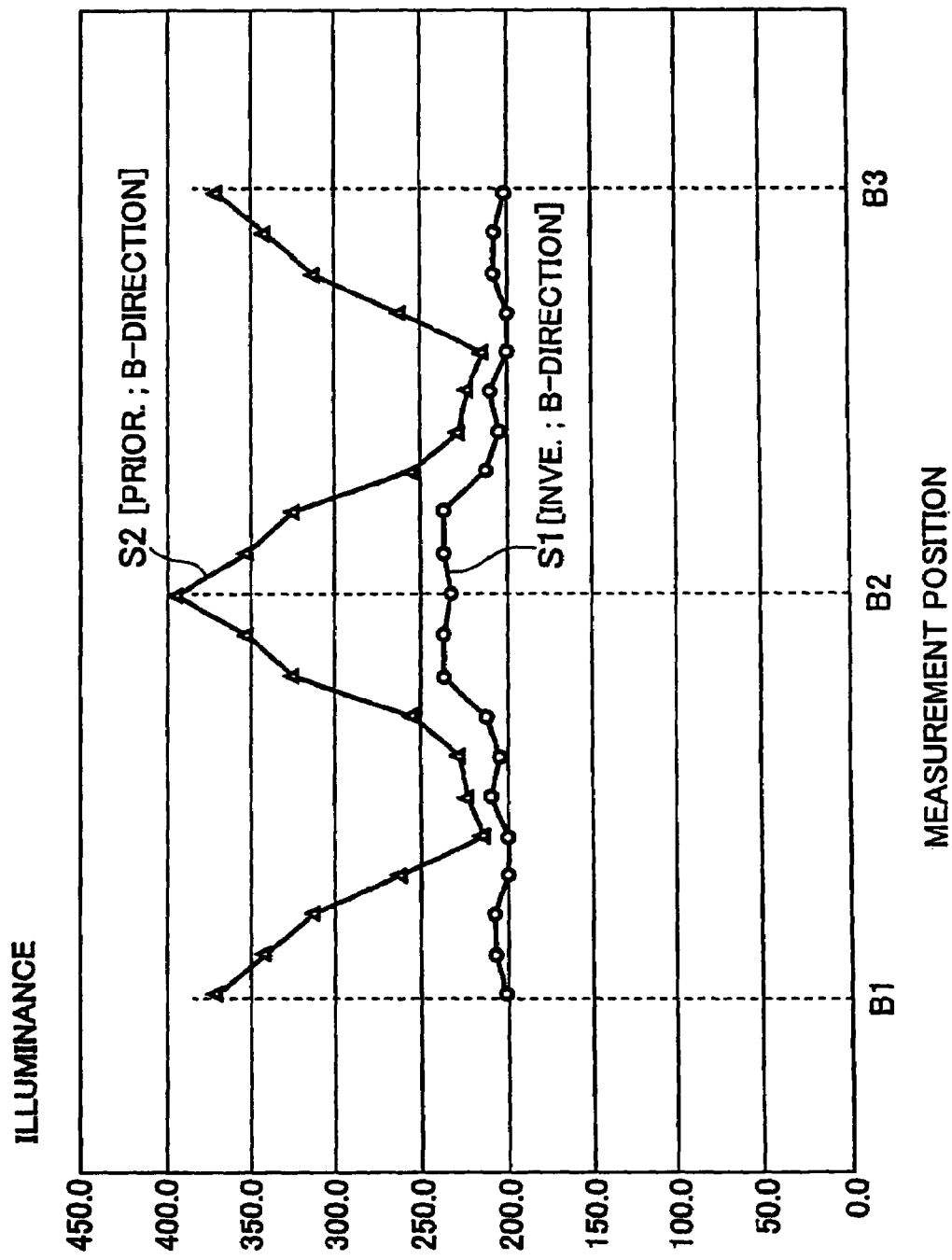
FIG. 10 is a graph showing an illuminance distribution along B-direction in FIG. 1 for a display member of a display according to the present invention, in contrast with an illuminance distribution for a prior art.
Figure 11:
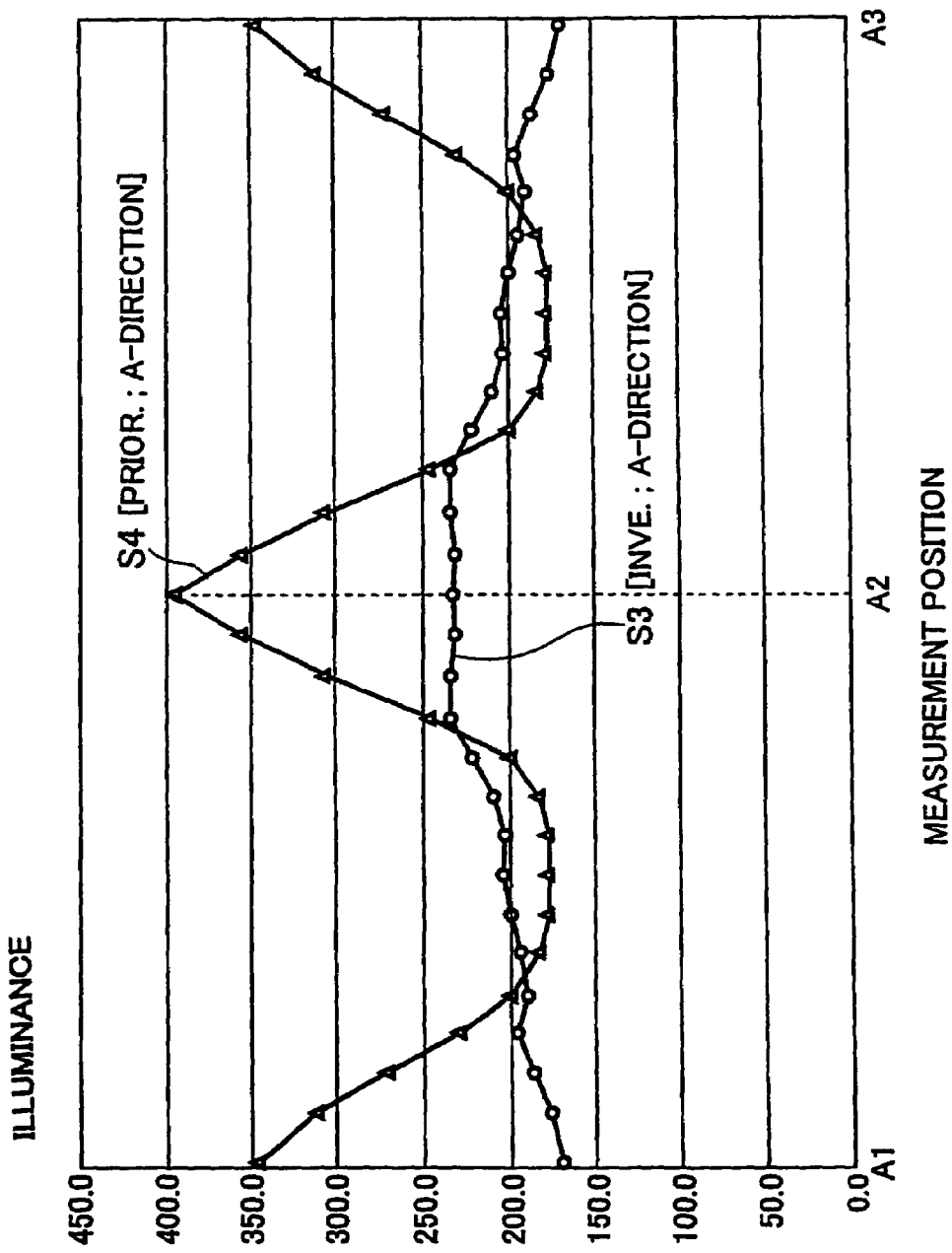
FIG. 11 is a graph showing an illuminance distribution along A-direction in FIG. 1 for a display member of a display according to the present invention, in contrast with an illuminance distribution for a prior art.

FIGS. 10 and 11 graphs showing distributions of illuminance on member-to-be-illuminated 3 (illuminance distribution) for display 1 to which the present invention is applied under a condition that light emitting elements 4 are disposed as shown in FIG. 1.

FIG. 10 gives line diagrams showing illuminance distribution measured along B-direction in FIG. 1. line diagram S1 illustrates illuminance distribution of the embodiment shown in FIGS. 1, 4a to 4d. In FIG. 10, line diagram S2 illustrates illuminance distribution obtained under a condition such that light emitting elements 120 of the prior art shown in FIG. 19 are arrayed in the same manner as the arrangement of light emitting elements 4 in display 1 in accordance with the present invention and measurement positions correspond to those for the present invention, with the light emitting elements 120 being lighted on.

On the other hand, FIG. 11 gives line diagrams showing illuminance distribution measured along A-direction in FIG. 1. Line diagram S3 illustrates illuminance distribution of the embodiment shown in FIGS. 1, 4a to 4d. In FIG. 10. Line diagram S4 shown in FIG. 11 illustrates illuminance distribution obtained under a condition such that light emitting elements 120 of the prior art shown in FIG. 19 are arrayed in the same manner as the arrangement of light emitting elements 4 in display 1 in accordance with the present invention and measurement positions correspond to those for the present invention, with the light emitting elements 120 being lighted on.

Measurement positions B1, B2, B3 in FIG. 10 correspond to positions of light emitting centers B1, B2, B3 of light emitting element 4 (i.e. positions of optical axes L) in FIG. 1. In addition, measurement positions A1, A2, A3 in FIG. 10 correspond to positions A1, A2, A3 in FIG. 1.

As shown in these diagrams, the present invention gives a very small difference in illuminance between locations just above light emitting element 4 and locations between light emitting elements 4, 4. while the prior art gives a very large difference in illuminance between locations just above light emitting element 4 and locations between light emitting elements 4, 4. That is, the present invention provides a more even illuminance distribution as compared with the prior art.

(Case of Single-LED-Lighting-On)

Figure 12:
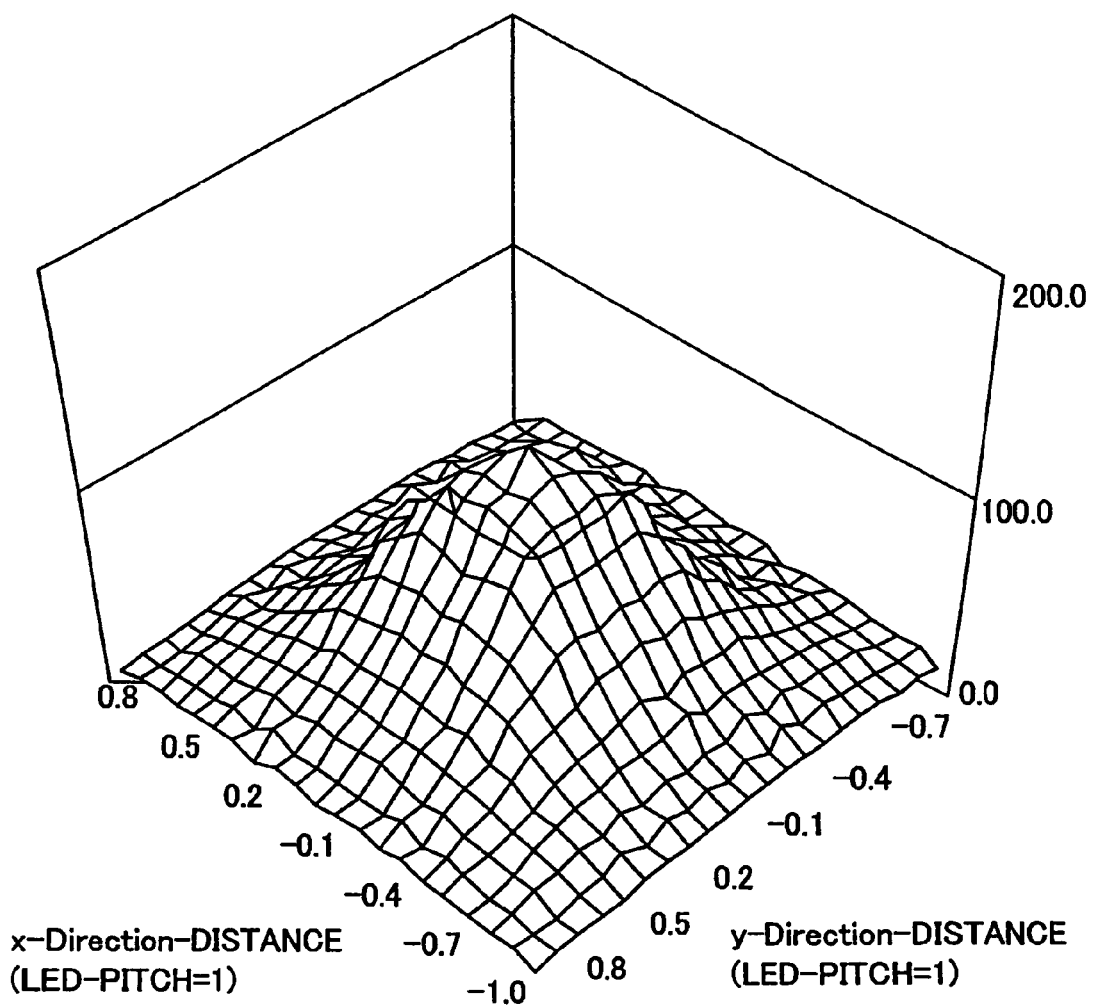

FIG. 12 is a graph showing three-dimensionally an illuminance distribution of light supplied to member-to-be-illuminated 3 of display 1 in accordance with the present invention under a condition such that only one of nine light emitting elements 4 is switched on. On the other hand, FIG. 13 is a graph showing three-dimensionally an illuminance distribution of light supplied to member-to-be-illuminated 3 in the prior art shown in FIG. 19 under a condition such that only one of light emitting element 120 is switched on.

Figure 13:
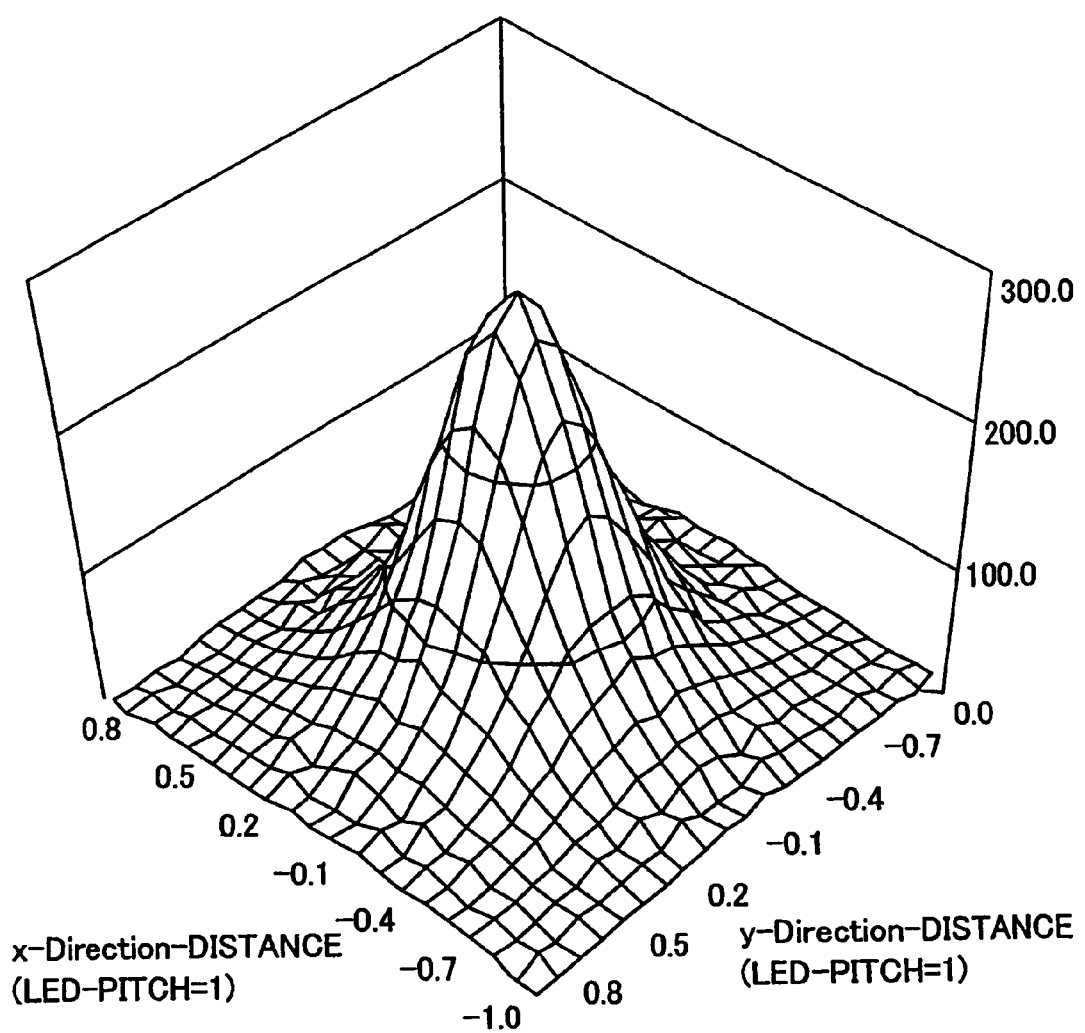

As understood by comparing FIG. 12 with FIG. 13, the present invention makes emission fluxes expanded in the vicinity of light emitting element 4 by function of light flux control member 5, with the result that emission from light emitting element 4 is irradiated to member-to-be-illuminated 3 after being expanded smoothly. To the contrary, the prior art causes emission fluxes to be concentrated in the vicinity of locations just above light emitting elements 120.

(Case of MULTI-LED-Lighting-On)

Figure 14:
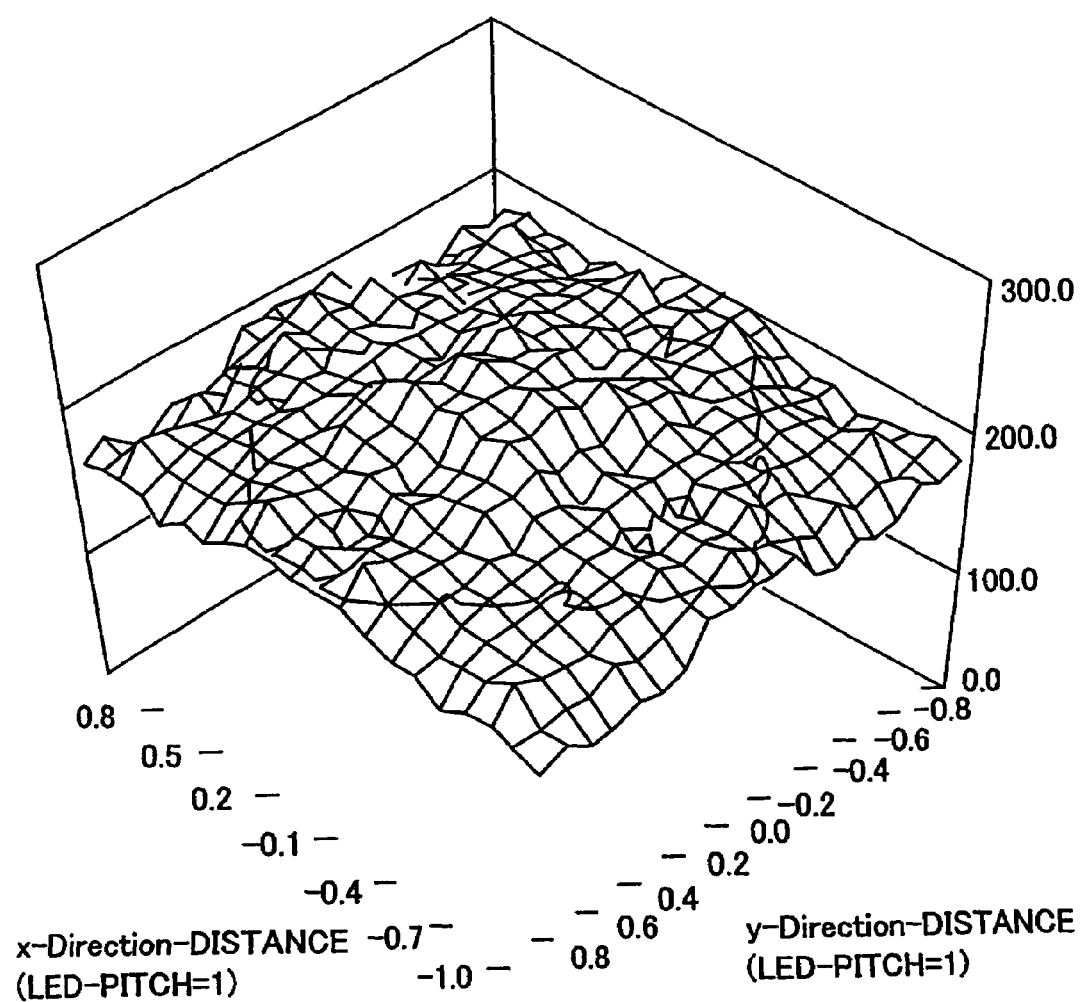

FIG. 14 is a graph showing three-dimensionally an illuminance distribution of light supplied to member-to-be-illuminated 3 of display 1 shown in FIG. 1 under a condition such that all of nine light emitting elements 4 are switched on. On the other hand, FIG. 15 is a graph showing three-dimensionally an illuminance distribution of light supplied to member-to-be-illuminated 3 in the prior art shown in FIG. 19 under a condition such that nine light emitting elements 120 are arrayed in the same manner as the arrangement of light emitting elements 4 in display 1 in accordance with the present invention and all of light emitting elements 120 are switched on.

Figure 15:
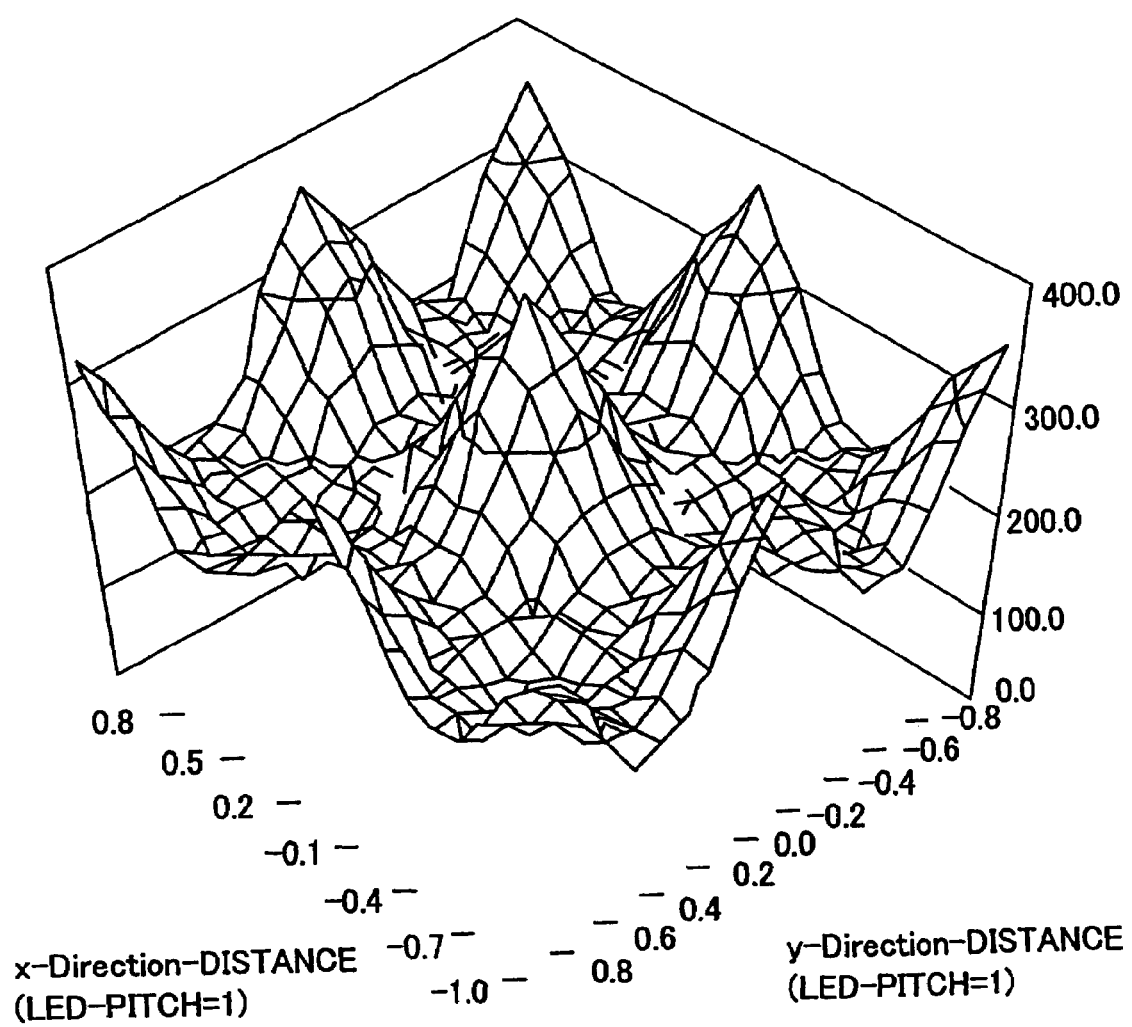

As understood by comparing FIG. 14 with FIG. 15, the present invention makes emission fluxes emitted anisotropically. under consideration of difference between A-direction of a small pitch and B-direction of a greater pitch ((See FIG. 1) by function of light flux control member 5.

Further, through employment of light flux control member 5, locations just above light emitting elements 4 are avoided from being irradiated excessively, with the result that light is delivered broadly to locations between light emitting elements 4, 4, in particular, locations between light emitting elements 4, 4, in B-direction of a large pitch (i.e. locations at which a dark portion appears).

Light from light emitting elements 4 adjacent to each other is mixed well and uniformalized illuminance is realized over the whole irradiation region of member-to-be-illuminated 3.

On the other hand, the prior art causes vicinages of locations just above light emitting elements 4 to be irradiated locally and brightly, with the result that difference in illuminance between vicinages of locations just above light emitting elements 4 and locations between light emitting elements 4, 4.

Figure 16:
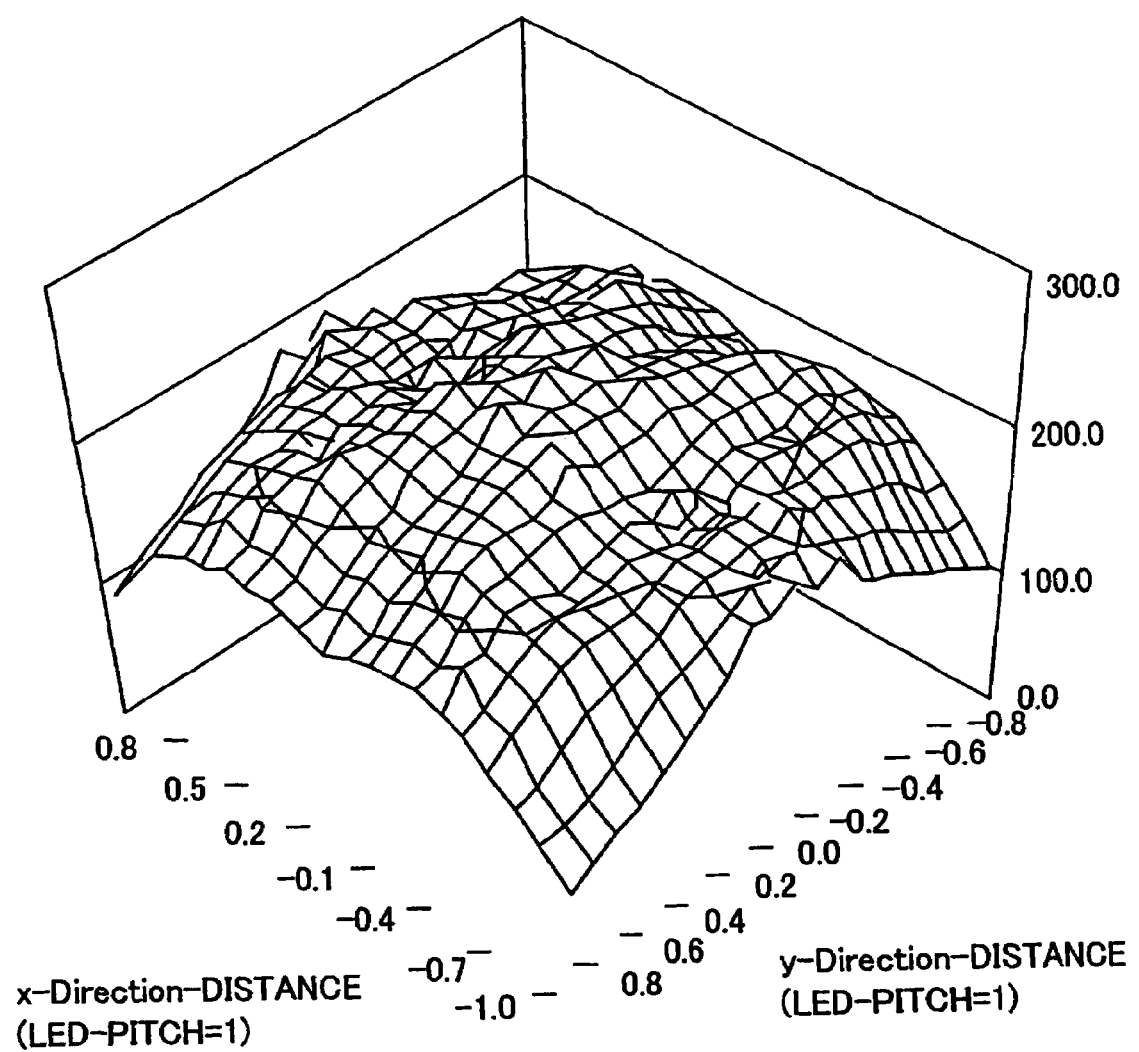

FIG. 16 is a graph showing three-dimensionally an illuminance distribution of light supplied to member-to-be-illuminated 3 of display 1 in accordance with the present invention shown in FIG. 9 under a condition such that all of seven light emitting elements 4 are switched on.

FIG. 17 is a graph showing three-dimensionally an illuminance distribution of light supplied to member-to-be-illuminated 3 in the prior art shown in FIG. 19 under a condition such that all of seven light emitting elements 120 are switched on, with seven light emitting elements 120 being arrayed in the same manner as the arrangement of light emitting elements 4 shown in FIG. 9.

As understood by comparing FIG. 16 with FIG. 17, the present invention makes the whole irradiation region of member-to-be-illuminated 3 irradiated uniformly by function of light flux control member 5 as described above. On the other hand, the prior art causes vicinages of locations just above light emitting elements 120 to be irradiated brightly and locally, with the result that difference in illuminance between vicinages of locations just above light emitting elements 120 and locations between light emitting elements 120.

Effects of the Embodiment

As described above, according to display 1 in accordance with the present invention, emission from light flux control member 5 is smoothly and efficiently expanded by effects of emission control face 6 of light flux control member 5, being mixed with light from a plurality of light emitting elements 4 around there, providing a highly brightness-even illumination light as shown in FIGS. 14 and 15.

Further, in the case of display 1 in accordance with the present invention, if uneven emission color of light emitting elements 4 (for example, color unevenness of white-LED 4 (such as yellowish shading)) exists, unevenness is not made conspicuous because light from a plurality of light emitting elements 4 are broadly mixed. Therefore, illumination quality is avoided from being reduced.

Figure 18A:
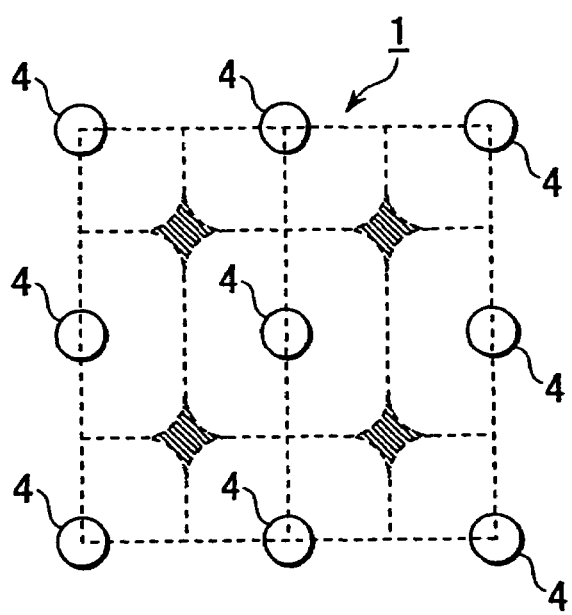
FIGS. 18a to 18d are diagrams illustrating low illuminance parts generated in a plane irradiated by light emitted from a light emitting element.
Figure 18B:
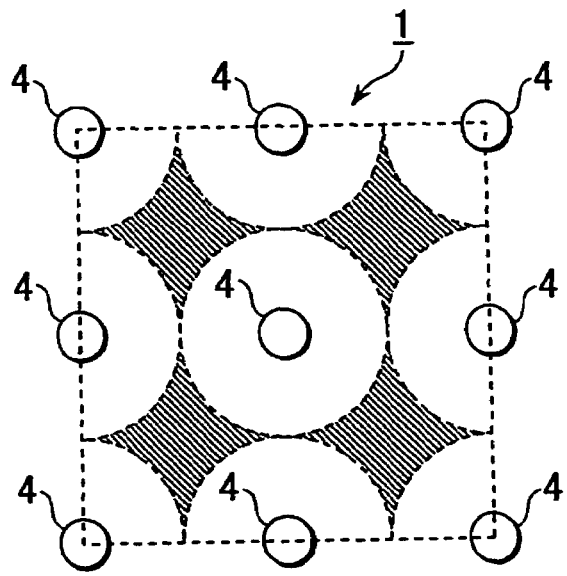

Next, studied are effects of "anisotropic planar outline shape" of emission control face 6 of light flux control member 5 by referring to FIGS. 18a and 18b.

FIG. 18a is a diagram illustrating low illuminance parts generated in light supplied to member-to-be-illuminated 3 as hatched parts under a condition such that all of nine light emitting elements 4 are switched on in display 1 shown in FIG. 1, and 4a to 4d in accordance with the present invention.

On the other hand, FIG. 18b is a diagram illustrating low illuminance parts generated in light supplied to member-to-be-illuminated 3 as hatched parts under a condition such that the present invention is not applied and, instead of light flux control member 5 having emission control face 6 of the planar outline shape shown in FIG. 4a, a light flux control member is employed, the light flux control member having a circular (substantially true-circular) planar outline shape and giving a constant value of θ5/θ1 regardless of changing of direction angle φ, shown in FIG. 7c, around optical axis L.

As understood by comparing FIG. 18a with FIG. 18b, display 1 in accordance with the present invention provides a broadly more even illuminance distribution as compared with the display having an arrangement as shown in FIG. 18b.

Figure 18C:
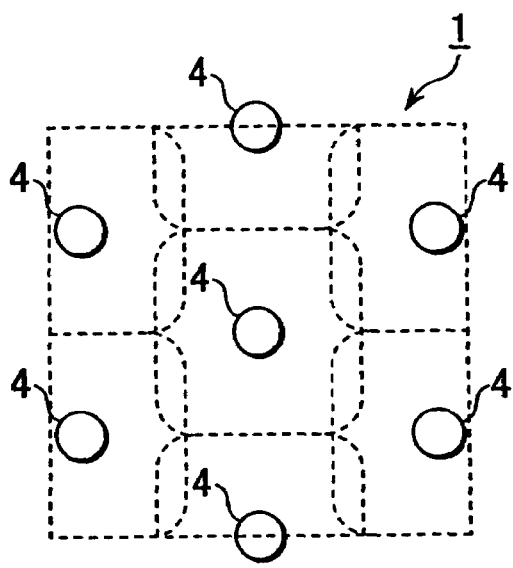

FIG. 18c is a diagram illustrating an irradiated range with dotted-line for light supplied to member-to-be-illuminated 3 under a condition such that all of seven light emitting elements 4 are switched on in display 1 shown in FIG. 9 in accordance with the present invention.

Figure 18D:
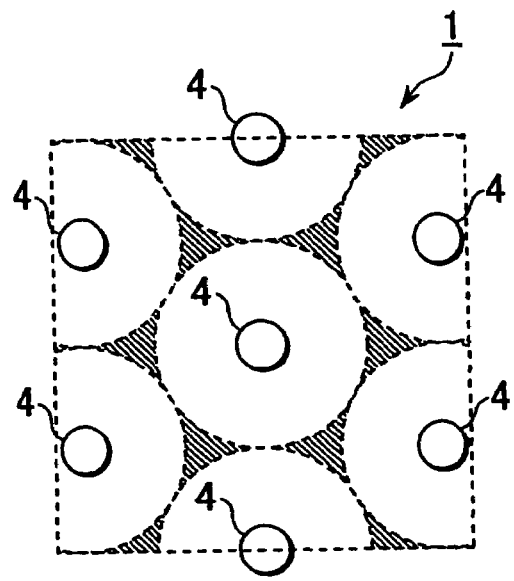

On the other hand, FIG. 18d is a diagram illustrating low illuminance parts generated in light supplied to member-to-be-illuminated 3 as hatched parts under a condition such that, instead of light flux control member 5 (See FIG. 4a) as shown in FIG. 18c, a light flux control member is employed, the light flux control member having a circular (substantially true-circular) planar outline shape and giving a constant value of θ5/θ1 regardless of changing of direction angle φ, shown in FIG. 7c, around optical axis L.

As understood by comparing FIG. 18c with FIG. 18d, display 1 in accordance with the present invention shown in FIG. 9 provides irradiation ranges overlapped each other, leading to a uniformalized illuminance. To the contrary, display 1 of FIG. 18d gives low illuminance parts between light emitting elements 4.

It is noted that display 1 in accordance with the present invention employing light flux control member 5 (See FIGS. 4a to 4d) causes member-to-be-illuminated 3 to be supplied with an illumination light flux having a rectangle-like cross section (See FIGS. 18a and 18c).

Second Embodiment

Figure 20A:
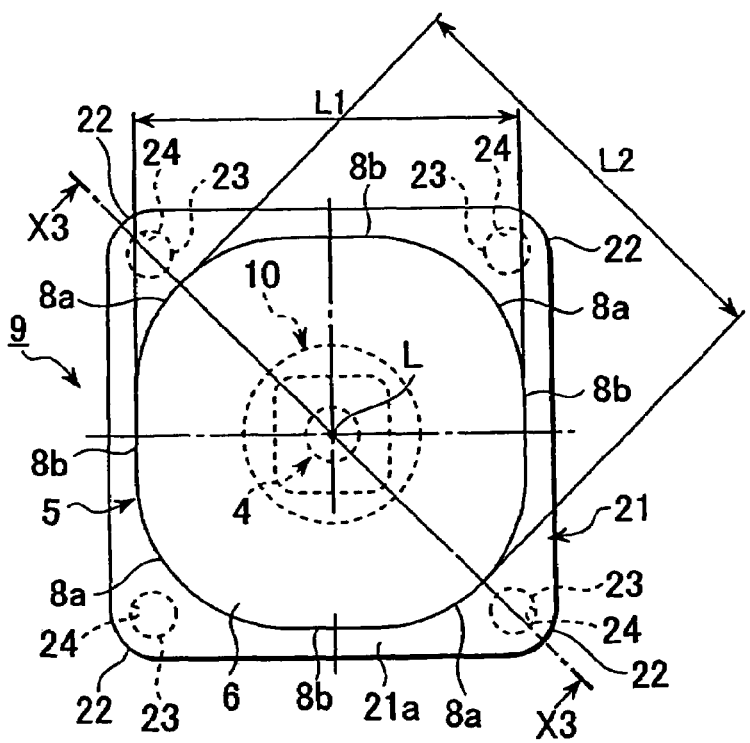
FIG. 20a is a plan view of a light emitting device included in a light emitting device according to a second embodiment of the present invention.
Figure 20B:
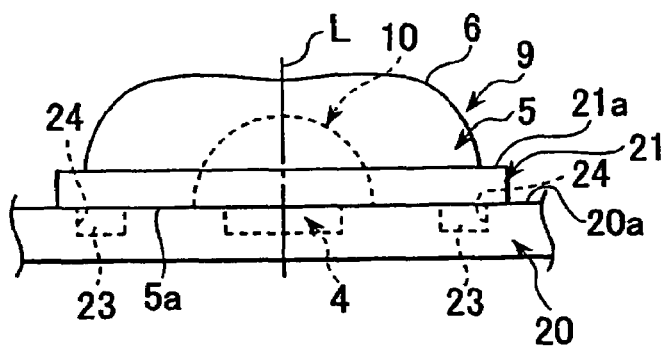
Figure 20C:
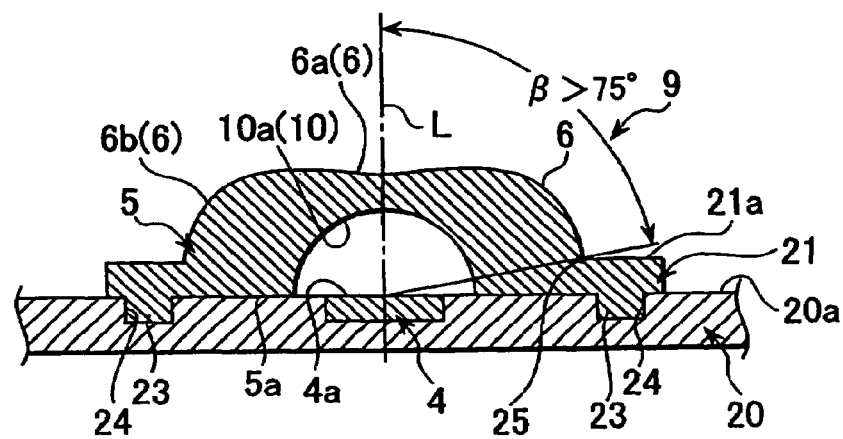

FIGS. 20a to 20c illustrate light emitting device 9 according to a second embodiment of the present invention. FIGS. 20a, 20b are plan view and side view of light emitting device 9, respectively, and FIG. 20c is a cross section view along lined X3-X3 in FIG. 20a.

It is noted that the same reference numerals are used in description of components employed both in this embodiment and light emitting device 9 of the first embodiment, avoiding the same description as that of the first embodiment from being repeated.

As shown in FIGS. 10a to 20c, light emitting device 9 of this embodiment comprises light emitting elements 4 which are buried in substrate 20 so that substrate surface 20a is generally flush with light emitting portion 4a. In addition, light flux control member 5 is mounted on substrate 20 as to cover light emitting portion 4a of light emitting e element 4.

Light flux control member 5 is positioned so that a center thereof is located on optical axis L extending from light emitting center of light emitting element 4, and semi-sphere-like recess 10 is formed as to correspond to light emitting element 4. In other words, recess 10 consists of only a semi-sphere-like inner-circumference surface having a center according with the light emitting center of light emitting element 4 (corresponding to first inner-circumference surface 10a in the first embodiment), being provided with a space inside thereof.

Light flux control member 5 has an outer periphery providing flange portion 21 at a side of lower face 5a. Flange portion 21 of light flux control member 5 has a rectangle-like planar shape having corner parts 22 with rounded edges (R-forming), and projections 23 are formed on lower faces of corner portions 22.

Projections 23 formed on a lower face of flange portion 21 of light flux control member 5 are engaged with positioning holes 24 formed on substrate 20 so that the center of light flux control member 5 is positioned with respect to a center of light emitting element 4.

Flange portion 21 has a thickness such that second emission face 6b of light flux control member 5 is not made narrower, being configured as to avoid emission function of light flux control member 5 from being spoiled.

In other words, flange portion 21 is formed so that connection portion 25 between upper face 21a of flange portion 21 and emission control face 6 of light flux control member 5 is located as to be deviated from optical axis L by 75° or more (β>75°).

As a result, light flux control member 5 of this embodiment can cause a reduced light of light emitting element 4 to enter into flange portion 21, and first and second emission faces 6a, 6b perform emission function in the same manner as the light flux control member 5 of the first embodiment. It is noted that light flux control member 5 is configured so that the whole lower face 5a including flange portion 21 (except for projections 23) provides a flat surface tightly contacting with substrate surface 20a.

Light flux control member 5 of the second embodiment is fixed by engaging projections 23 of the lower face of flange portion 21 with positioning holes 24 so that the lower face comes in contact with substrate surface 20a.

Fixing of light flux control member 5 to substrate 20 may be done by pushing projections 23 into positioning holes 24 or by gluing lower face 5a to substrate surface 20a by the use of an adhesive. Considering reflectivity or light-permeability, the adhesive, if used, is preferably transparent or white.

It is noted that modifications may be employed as follows.

(I) An outer periphery of flange portion 21 may have a planar shape other than rectangle-like shape. For example, flange portion 21 may have a circular or otherwise-shaped outer edge planar shape.

(II) In this embodiment, the respective corner portions 22 of flange portion 21 have projections 23 (four items in total). However, this is merely an example. For example, only a pair of corners 22 at ends of a diagonal may have projections 23 (two items in total).

Figure 21A:
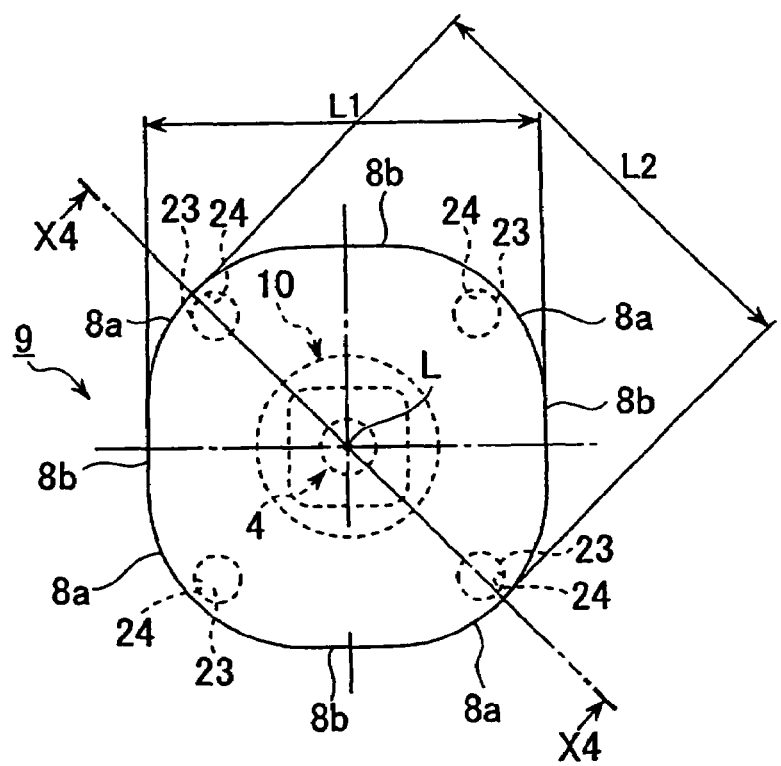
FIG. 21a is a plan view of a light emitting device employed in a first modification of the second embodiment.
Figure 21B:
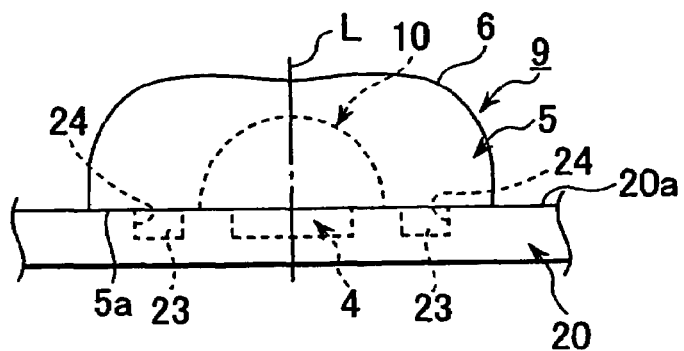
Figure 21C:
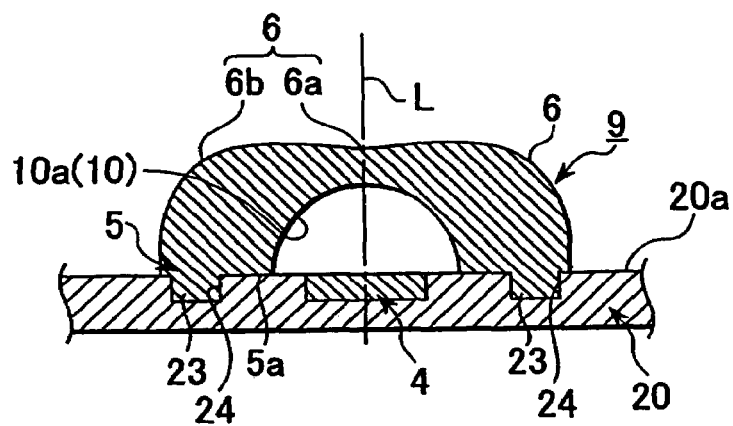

(III) In this embodiment, projections 23 are formed on the lower face of flange portion 21. However, this is merely an example. For example, projections 23 may be formed on lower face 5a of light flux control member 5 without forming flange portion 21 as shown in FIGS. 21a to 21c.

Figure 22A:
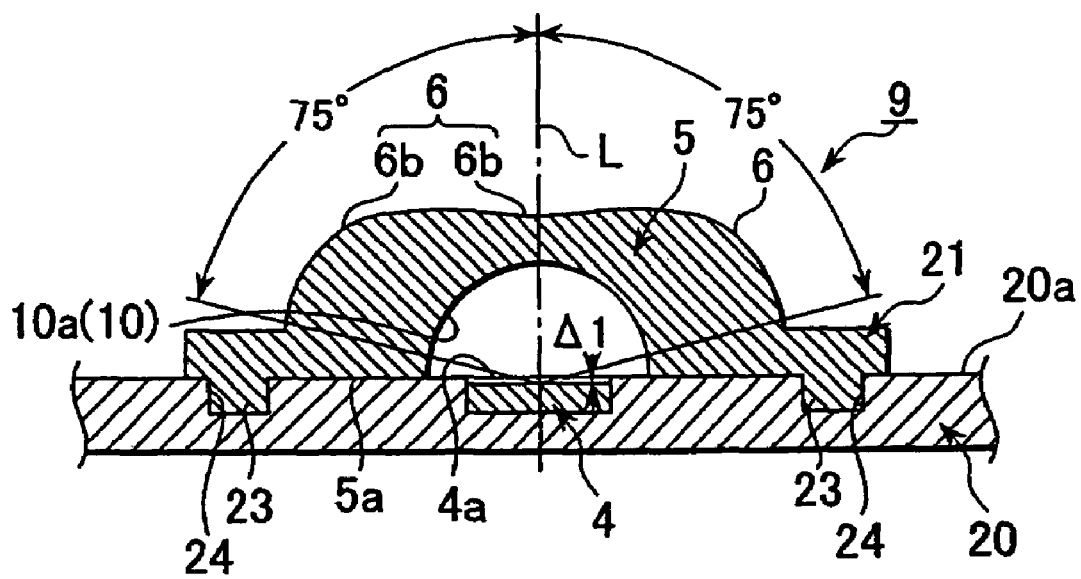
FIG. 22a is a cross section view of a light emitting device employed in a second modification of the second embodiment (illustration corresponding to FIG. 20a); and, FIG. 22b is a cross section view of a light emitting device employed in a third modification of the second embodiment (illustration corresponding to FIG. 20a).
Figure 22B:
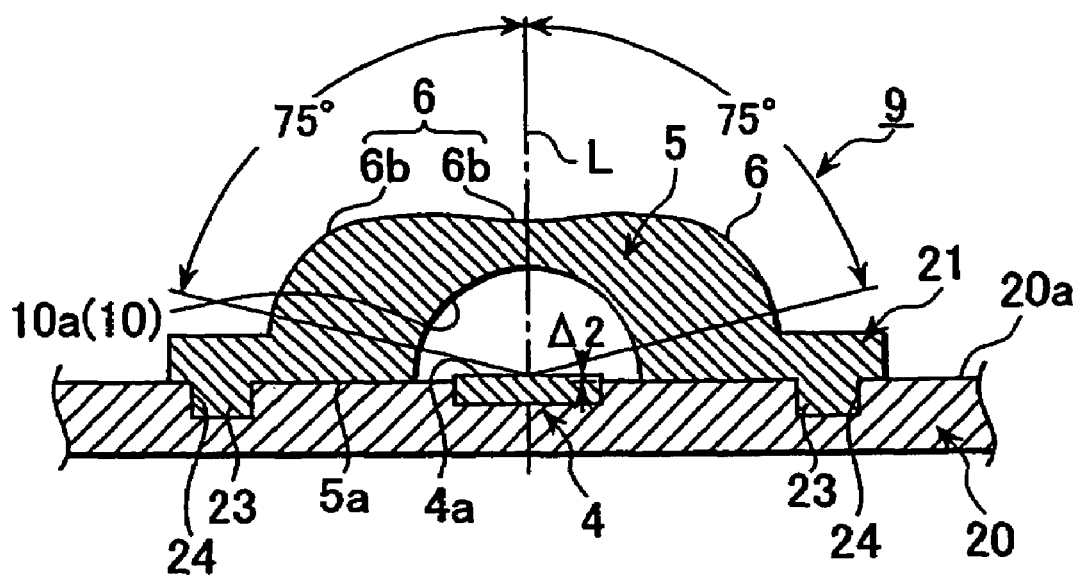

(IV) In this embodiment, substrate surface 20a is generally flush with light emitting portion 4a. However, this is merely an example. For example, as shown in FIG. 22a, light emitting portion 4a of light emitting element 4 may be set far back by a certain dimension Δ1 from substrate surface 20a so far as an area of second emission face 6b made narrow. Alternatively, as shown in FIG. 22b, emitting portion 4a of light emitting element 4 may be set forward by a certain dimension Δ2 from substrate surface 20a.

(V) In this embodiment, light flux control member 5 is configured so that the whole lower face 5a including flange portion 21 (except for projections 23) is tightly in contact with substrate surface 20a. However, this is merely an example. For example, a ring-like sealing face surrounding light emitting portion 4a of light emitting element 4 may be formed in order to preventing dust of the external of light flux control member 5 from coming to light emitting portion 4a of light emitting element 4 or into recess 10, and only a part of lower face 5a of light flux control member 5 my be tightly in contact with substrate surface 20a.

(VI) In this embodiment, positioning holes 24 are formed at the side of substrate 20 and projections 23 engaging with them are formed at the side of light flux control member 5. However, this is merely an example. For example, employable is an employable arrangement such that projections are formed at the side of substrate 20 and positioning holes 24 engaging with them are formed at the side of light flux control member 5.

What is claimed is:

1. A light emitting device comprising:
    a light flux control member via which light from a light emitting element is emitted,
    wherein said light flux control member has a recess and an emission control face, said recess being arranged corresponding to said light emitting element and provides a light input portion for causing light emitted from said light emitting element to be inputted into said light flux control member, and said emission control face causing light inputted into said light flux control member to be outputted after inner propagation, and
    said emission control face is configured so that a projection image of said emission control face onto an imaginary plane perpendicular to a datum optical axis of said light emitting device provides a planar outline shape anisotropic around said datum optical axis, and so that the following Conditions 1 to 3 are satisfied,
    Condition 1 is that a relation of $(\theta 5/\theta 1)>1$ is satisfied except for light of directions angularly near to a direction of said datum optical axis,
    Condition 2 is that the value of $\theta 5/\theta 1 (>1)$ according to the above Condition 1 gets smaller gradually with increasing of $\theta 1$,
    Condition 3 is that the value of $\theta 5/\theta 1 (>1)$ according to the above Condition 1 shows dependency on direction around said datum optical axis,
    where $\theta 1$ is an angle made by an inner incident light to said emission control face on inner incidence with respect to a line which passes a position of said inner incidence and is parallel to said datum optical axis of said light emitting device, and $\theta 5$ is angle made by said inner incident light with respect to said line on being emitted from said emission control face.

2. A light emitting device in accordance with claim 1, wherein said planar outline shape has minimum outline portions, which are distant from said datum optical axis by the minimum distance and arranged around said datum optical axis at angular intervals of 90°, and maximum outline portions which are distant from said datum optical axis by the maximum distance and arranged around said datum optical axis and between minimum outline portions adjacent to each other, and further the following Condition 4 is satisfied,
    Condition 4 is that the value of $\theta 5/\theta 1 (>1)$ according to the above Condition 1 gets greater, under a condition such that $\theta 1$ is not changed, as said direction around said datum optical axis gets nearer from a direction corresponding to a minimum outline portion toward another direction corresponding to a maximum outline portion.

3. A light emitting device in accordance with claim 1 or 2, wherein said light emitting element is accommodated in said recess.

4. A light emitting device in accordance with claim 1 or 2, wherein said light of directions angularly near to said direction of said datum optical axis is light falling within a range of ±5° with respect to said direction of said datum optical axis.

5. A light emitting device in accordance with claim 3, wherein said light of directions angularly near to said direction of said datum optical axis is light falling within a range of ±5° with respect to said direction of said datum optical axis.

6. A light emitting device in accordance with claim 3, wherein a gap is arranged between a surface of said recess and said light emitting element.

7. A light emitting device in accordance with claim 3, wherein said light emitting element has a sealing portion consisting of sealing material and a gap is arranged between a surface of said recess and said sealing portion.

8. A light emitting device in accordance with claim 3, wherein a surface of said recess is tightly in contact with said light emitting element.

9. A light emitting device in accordance with claim 3, wherein said light emitting element has a sealing portion consisting of sealing material and a surface of said recess is tightly in contact with said sealing portion.

10. A light emitting device in accordance with claim 1 or 2, wherein said emission control face has a first emission surface near to said datum optical axis and a second emission surface located around said first emission surface, and a point of inflection is provided by a connection portion between said first emission surface and said second emission surface.

11. A light emitting device in accordance with claim 3, wherein said emission control face has a first emission surface near to said datum optical axis and a second emission surface located around said first emission surface, and a point of inflection is provided by a connection portion between said first emission surface and said second emission surface.

12. A light emitting device in accordance with claim 4, wherein said emission control face has a first emission surface near to said datum optical axis and a second emission surface located around said first emission surface, and a point of inflection is provided by a connection portion between said first emission surface and said second emission surface.

13. A surface light source device comprising at least one light emitting device and a light diffusion member transmitting and diffusing light from said light emitting device, wherein said light emitting device is according to claim 1 or 2.

14. A surface light source device comprising at least one light emitting device and a light diffusion member transmitting and diffusing light from said light emitting device, wherein said light emitting device is according to claim 3.

15. A surface light source device comprising at least one light emitting device and a light diffusion member transmitting and diffusing light from said light emitting device, wherein said light emitting device is according to claim 4.

16. A surface light source device comprising at least one light emitting device and a light diffusion member transmitting and diffusing light from said light emitting device, wherein said light emitting device is according to claim 5.

17. A surface light source device comprising at least one light emitting device and a light diffusion member transmitting and diffusing light from said light emitting device, wherein said light emitting device is according to claim 6.

18. A surface light source device comprising at least one light emitting device and a light diffusion member transmitting and diffusing light from said light emitting device, wherein said light emitting device is according to claim 7.

19. A surface light source device comprising at least one light emitting device and a light diffusion member transmitting and diffusing light from said light emitting device, wherein said light emitting device is according to claim 8.

20. A surface light source device comprising at least one light emitting device and a light diffusion member transmitting and diffusing light from said light emitting device, wherein said light emitting device is according to claim 9.

21. A surface light source device comprising at least one light emitting device and a light diffusion member transmitting and diffusing light from said light emitting device, wherein said light emitting device is according to claim 10.

22. A surface light source device comprising at least one light emitting device and a light diffusion member transmitting and diffusing light from said light emitting device, wherein said light emitting device is according to claim 11.

23. A surface light source device comprising at least one light emitting device and a light diffusion member transmitting and diffusing light from said light emitting device, wherein said light emitting device is according to claim 12.

24. A light flux control member which allows light from a light emitting element to be inputted thereto and emits direction-controlled light, comprising:
   a recess which is arranged corresponding to said light emitting element and provides a light input portion for causing light emitted from said light emitting element to be inputted into said light flux control member; and
   an emission control face which causes light inputted into said light flux control member to be outputted after inner propagation,
   wherein said emission control face is configured so that a projection image of said emission control face onto an imaginary plane perpendicular to an optical axis of said light emitting element provides a planar outline shape anisotropic around said optical axis, and so that the following Conditions 1 to 3 are satisfied,
   Condition 1 is a relation of $(\theta 5/\theta 1)>1$ is satisfied except for light of directions angularly near to a direction of said optical axis,
   Condition 2 is that the value of $\theta 5/\theta 1(>1)$ according to the above Condition 1 gets smaller gradually with increasing of $\theta 1$,
   Condition 3 is that the value of $\theta 5/\theta 1(>1)$ according to the above Condition 1 shows dependency on direction around said optical axis,
   where $\theta 1$ is an angle made by an inner incident light to said emission control face on inner incidence with respect to a line which passes a position of said inner incidence and is parallel to said datum optical axis of said light emitting device, and $\theta 5$ is angle made by said inner incident light with respect to said line on being emitted from said emission control face.

25. A light flux control member in accordance with claim 24, wherein said planar outline shape has minimum outline portions, which are distant from said datum optical axis by the minimum distance and arranged around said datum optical axis at angular intervals of 90°, and maximum outline portions which are distant from said datum optical axis by the maximum distance and arranged around said datum optical axis and between minimum outline portions adjacent to each other, and further the following Condition 4 is satisfied,
   Condition 4 is that the value of $\theta 5/\theta 1(>1)$ according to the above Condition 1 gets greater, under a condition such that $\theta 1$ is not changed, as said direction around said datum optical axis gets nearer from a direction corresponding to a minimum outline portion toward another direction corresponding to a maximum outline portion.

26. A light flux control member in accordance with claim 24 or 25, wherein said light emitting element is accommodated in said recess.

27. A light flux control member in accordance with claim 24 or 25, wherein said light of directions angularly near to said direction of said optical axis is light falling within a range of ±5° with respect to said direction of said optical axis.

28. A light flux control member in accordance with claim 26, wherein said light of directions angularly near to said direction of said optical axis is light falling within a range of ±5° with respect to said direction of said optical axis.

* * * * *

UNITED STATES PATENT AND TRADEMARK OFFICE
CERTIFICATE OF CORRECTION

PATENT NO. : 7,621,657 B2
APPLICATION NO. : 11/657076
DATED : November 24, 2009
INVENTOR(S) : Shingo Ohkawa It is certified that error appears in the above-identified patent and that said Letters Patent is hereby corrected as shown below:

Column 3, Line 21, change "($\downarrow 5/\theta 1) > 1$" to --$(\theta 5/\theta 1) > 1$--.

Column 5, Line 44, change "XI-XI" to --X1-X1--.

Column 8, Line 9, change "reference plane" to --"reference plane".--.

Column 8, Line 32, change "L)" to --L).--.

Column 10, Line 30, change "$(\Phi(0° < \Phi < 90°;$" to --$(\Phi(0° < \Phi < 90°);$--.

Column 11, Line 36, change "$\Phi = 0°0$" to --$\Phi = 0°$--.

Column 17, Line 14, change "gluing" to --glueing--.

Column 18, Line 36, after "Condition" delete "4".

Column 20, Line 44, after "Condition" delete "4".

Signed and Sealed this

Ninth Day of February, 2010

David J. Kappos
*Director of the United States Patent and Trademark Office*